US012492521B2

(12) United States Patent
Yamaoka et al.

(10) Patent No.: US 12,492,521 B2
(45) Date of Patent: *Dec. 9, 2025

(54) SNOW THROWER

(71) Applicant: Nanjing Chervon Industry Co., Ltd., Nanjing (CN)

(72) Inventors: Toshinari Yamaoka, Nanjing (CN); Fangjie Nie, Nanjing (CN); Huixing Fu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,978

(22) Filed: Jun. 11, 2024

(65) Prior Publication Data
US 2024/0328105 A1 Oct. 3, 2024

Related U.S. Application Data

(63) Continuation of application No. 17/327,978, filed on May 24, 2021, now Pat. No. 12,037,758, which is a
(Continued)

(30) Foreign Application Priority Data

Aug. 22, 2018 (CN) .......................... 201810958736.8

(51) Int. Cl.
E01H 5/09 (2006.01)
H02K 7/116 (2006.01)
(Continued)

(52) U.S. Cl.
CPC ............. E01H 5/098 (2013.01); H02K 7/116 (2013.01); H02K 11/0094 (2013.01); F16H 1/222 (2013.01)

(58) Field of Classification Search
CPC ......... E01H 5/098; E01H 5/045; E01H 5/076; E01H 5/08; E01H 5/09
(Continued)

(56) References Cited

U.S. PATENT DOCUMENTS 1,587,449 A     6/1926   Wandscheer
7,122,930 B2   10/2006   Yamagishi
(Continued)

FOREIGN PATENT DOCUMENTS

CA     2953628 A1   12/2016
CA     2870291 A1    9/2019
(Continued)

OTHER PUBLICATIONS

Examiner Requisition issued on Canadian patent application No. 3,110,144, dated Feb. 7, 2022, 7 pages.
(Continued)

Primary Examiner — Jamie L McGowan
(74) Attorney, Agent, or Firm — Greenberg Traurig, LLP

(57) ABSTRACT

A snow thrower includes a first drive shaft enabled to rotate about a first axis; an auger having auger blades mounted to the first drive shaft, a second drive shaft enabled to rotate about a second axis, an impeller having an impeller base mounted to the second drive shaft and impeller blades where the second axis and the first axis are perpendicular to each other, a walking wheel assembly, a first motor configured to drive the walking wheel assembly to rotate, a second motor configured to drive the auger to rotate about the first axis and drive the impeller to rotate about the second axis, a first reduction assembly including first-type gears for realizing power transmission between the second motor and the second drive shaft, and a second reduction assembly including second-type gears for realizing power transmission between the second drive shaft and the first drive shaft.

12 Claims, 29 Drawing Sheets

Related U.S. Application Data continuation of application No. 17/077,424, filed on Oct. 22, 2020, now Pat. No. 11,015,314, which is a continuation of application No. PCT/CN2019/102075, filed on Aug. 22, 2019.

(51) Int. Cl.
   *H02K 11/00* (2016.01)
   *F16H 1/22* (2006.01)

(58) Field of Classification Search
   USPC .......................................................... 37/246
   See application file for complete search history.

(56) References Cited

U.S. PATENT DOCUMENTS

| | | | |
|---|---|---|---|
| 7,159,343 B2 | 1/2007 | Hanafusa | |
| 9,991,825 B1* | 6/2018 | Ackerman | ................ H02P 7/06 |
| 10,428,479 B2 | 10/2019 | Fu | |
| 11,015,314 B2 | 5/2021 | Yamaoka | |
| 12,037,758 B2* | 7/2024 | Yamaoka | ................ E01H 5/098 |
| 2004/0148819 A1 | 8/2004 | Hanafusa | |
| 2005/0097785 A1 | 5/2005 | Wakitani | |
| 2006/0086009 A1 | 4/2006 | Kuroiwa | |
| 2006/0150444 A1 | 7/2006 | Friberg | |
| 2007/0084091 A1 | 4/2007 | Umemura | |
| 2008/0196280 A1 | 8/2008 | Morin | |
| 2010/0283336 A1 | 11/2010 | Vasilesco | |
| 2011/0094129 A1* | 4/2011 | Rowe | ..................... E01H 5/045 37/246 |
| 2013/0291412 A1 | 11/2013 | Cmich | |
| 2014/0202047 A1 | 7/2014 | Kawakami | |
| 2016/0138234 A1 | 5/2016 | Duchscherer | |
| 2016/0362859 A1 | 12/2016 | Schaedler | |
| 2017/0101756 A1* | 4/2017 | Zhang | ..................... B60K 1/00 |
| 2017/0152638 A1 | 6/2017 | Fu | |
| 2017/0248196 A1* | 8/2017 | Turner | .................... F02N 11/04 |
| 2019/0003137 A1 | 1/2019 | Gao | |
| 2019/0187693 A1* | 6/2019 | Towers | ................. B60K 25/02 |
| 2021/0040701 A1 | 2/2021 | Yamaoka | |
| 2021/0127572 A1* | 5/2021 | Meyer | ................... A01D 34/81 |
| 2021/0277617 A1 | 9/2021 | Yamaoka | |

FOREIGN PATENT DOCUMENTS

| | | |
|---|---|---|
| CN | 102691275 A | 9/2012 |
| CN | 203872585 U | 10/2014 |
| CN | 102704432 A | 2/2015 |
| CN | 104972883 A | 10/2015 |
| CN | 104805794 A | 9/2016 |
| CN | 104805795 A | 9/2016 |
| CN | 206090440 U | 4/2017 |
| CN | 106812110 A | 6/2017 |
| CN | 206359941 U | 7/2017 |
| CN | 206800303 U | 12/2017 |
| CN | 207079536 U | 3/2018 |
| CN | 106702941 A | 9/2018 |
| CN | 108790946 A | 11/2018 |
| CN | 106057553 A | 12/2018 |
| JP | 2006288296 A | 10/2006 |
| JP | 2007056444 A | 3/2007 |
| WO | 2016197433 A1 | 12/2016 |
| WO | 2017133708 A1 | 8/2017 |

OTHER PUBLICATIONS

Extended European search report issued on European publication No. 3825467, dated Aug. 11, 2021, 9 pages.

International Search Report issued on PCT application No. PCT/CN2019/102075, dated Nov. 20, 2019, 2 pages.

* cited by examiner

SNOW THROWER

RELATED APPLICATION INFORMATION

The present application is a continuation of U.S. application Ser. No. 17/327,978, filed on May 24, 2021, which application is a continuation of U.S. application Ser. No. 17/077,424, filed on Oct. 22, 2020, which application is a continuation of International Application Number PCT/CN2019/102075, filed on Aug. 22, 2019, through which this application also claims the benefit under 35 U.S.C. § 119 (a) of Chinese Patent Application No. 201810958736.8, filed on Aug. 22, 2018, which applications are incorporated herein by reference in their entireties.

TECHNICAL FIELD

The present application relates to a garden tool, such as a snow thrower.

BACKGROUND

As a hand-push power tool, a snow thrower is used as important equipment for snow removal in winter. Being efficient, economic, and environmentally friendly, snow throwers are gradually promoted both at home and abroad, thanks to the ever-increasing economy and the continuous progress of society. Depending on the power source, snow throwers can be divided into two categories: engine-driven and motor-driven. Depending on the travel mode, snow throwers can be divided into two categories: hand-push and self-propelled. Depending on the functional structure, snow throwers can be divided into single-stage snow throwers and two-stage snow throwers. Most of the self-propelled single-stage snow throwers in the art are driven by belts, etc., resulting in low snow removal efficiency, a complex machine structure and a large machine size.

SUMMARY

In one aspect of the disclosure, a snow thrower includes a first drive shaft enabled to rotate about a first axis; an auger having auger blades mounted to the first drive shaft; a second drive shaft enabled to rotate about a second axis; an impeller having an impeller base mounted to the second drive shaft and impeller blades mounted to the impeller base, the second axis and the first axis being perpendicular to each other; a walking wheel assembly configured to support the snow thrower to enable the snow thrower to walk on a ground; a first motor configured to drive the walking wheel assembly to rotate; a second motor configured to drive the auger to rotate about the first axis and drive the impeller to rotate about the second axis; a first reduction assembly including first-type gears for realizing power transmission between the second motor and the second drive shaft; and a second reduction assembly including second-type gears for realizing power transmission between the second drive shaft and the first drive shaft.

DETAILED DESCRIPTION

Figure 1:
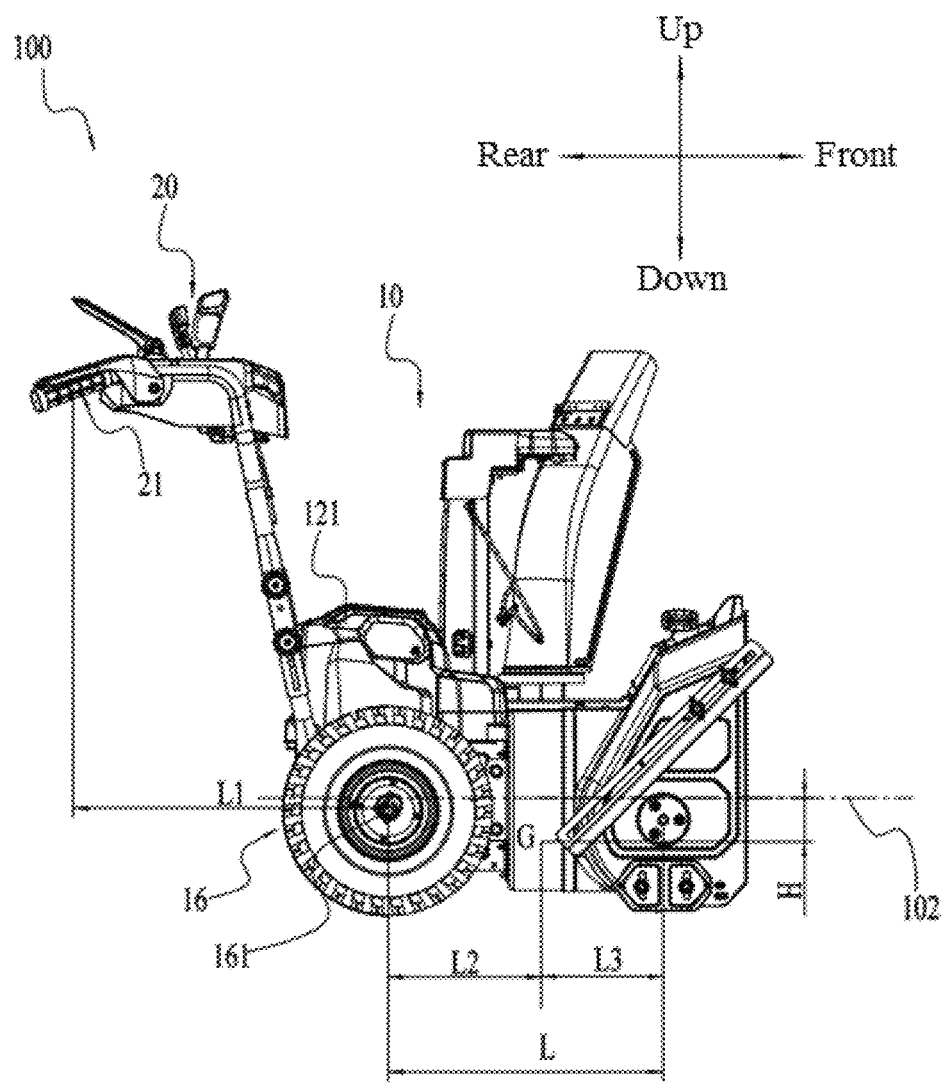
FIG. 1 is a front view of a snow thrower according to an example.
Figure 2:
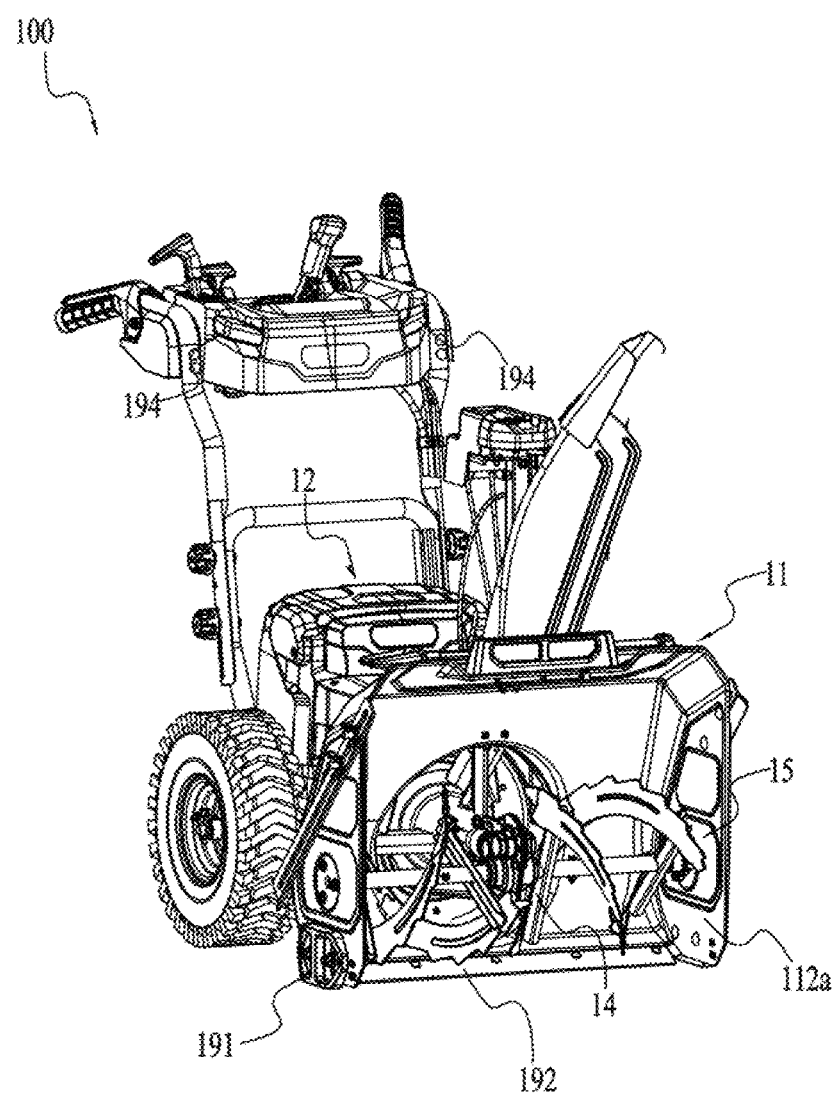
FIG. 2 is a perspective view of a snow thrower according to an example.
Figure 3:
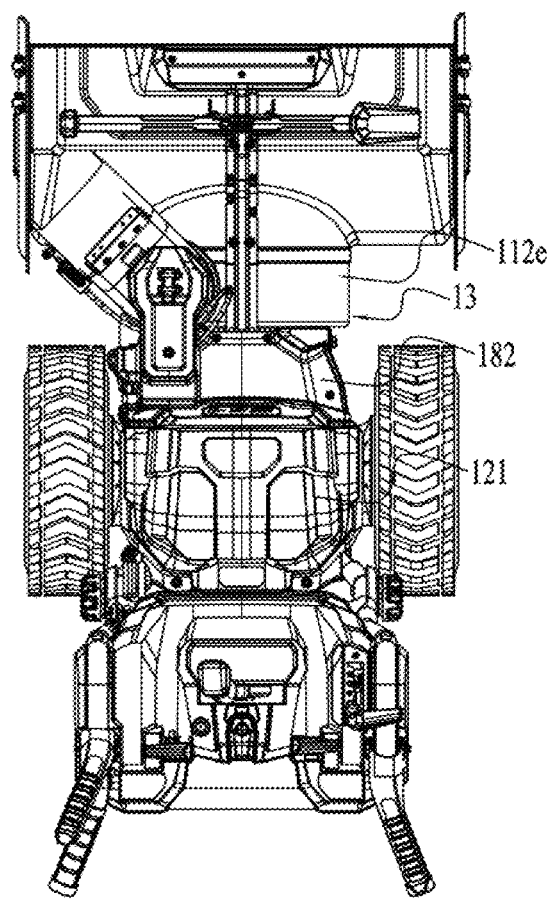
FIG. 3 is a top view of a snow thrower according to an example.

FIG. 1 shows a schematic diagram of a snow thrower 100 according to an example. As shown in FIGS. 1-3, the snow thrower 100 includes a body 10 and an operating assembly 20. The body 10 at least includes a walking wheel assembly 16 enabling the snow thrower 100 to walk on, i.e., move on, the ground. The operating assembly 20 is connected to the body 10. The body 10 also includes a body housing 11, an energy system 12, a power system 13, a transmission system 14, and a snow removal system 15. The transmission system 14 is configured to transfer kinetic energy from the power system 13 to the snow removal system 15. For the convenience of description, according to the advancing direction of the snow thrower 100 under general operating conditions, the front, rear, up, and down directions are defined as shown in FIG. 1. The operating assembly 20 includes an upper connecting rod, the body 10 includes a lower connecting rod, and the upper connecting rod is at least partially located on the upper side of the lower connecting rod. The upper connecting rod and the lower connecting rod are connected by fasteners such as screws and nuts to realize the connection between the body 10 and the operating assembly 20. The upper connecting rod and the lower connecting rod form a telescopic connection to adjust the height of the operating assembly 20 relative to the ground. In this example, the upper connecting rod and the lower connecting rod form a sliding connection through a U-shaped groove.

Figure 4:
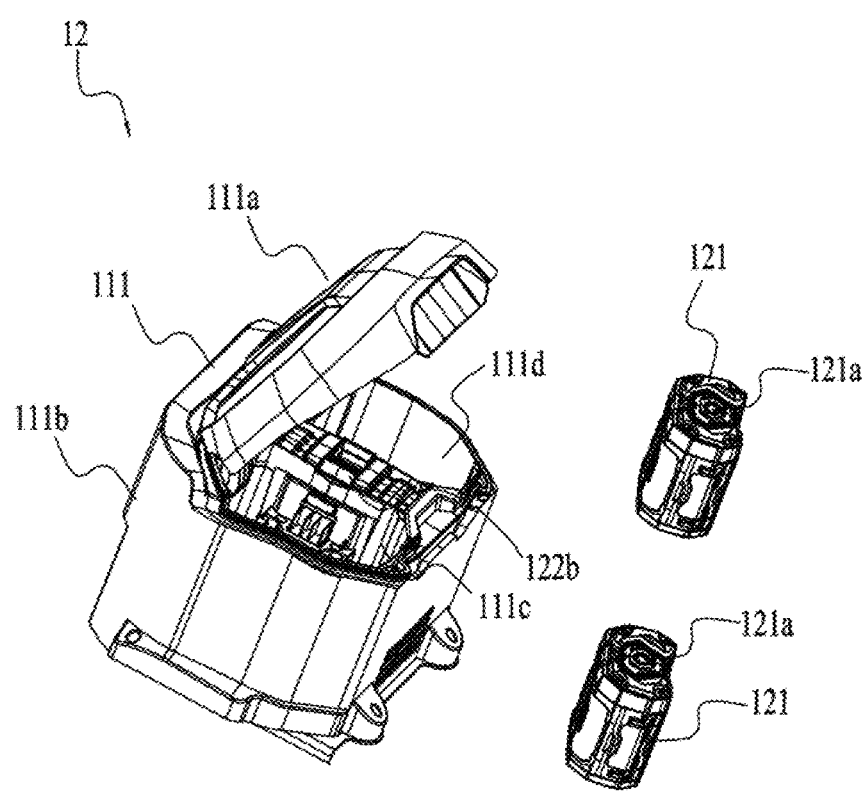
FIG. 4 is an exploded view of an energy system of the snow thrower in FIG. 1.
Figure 5:
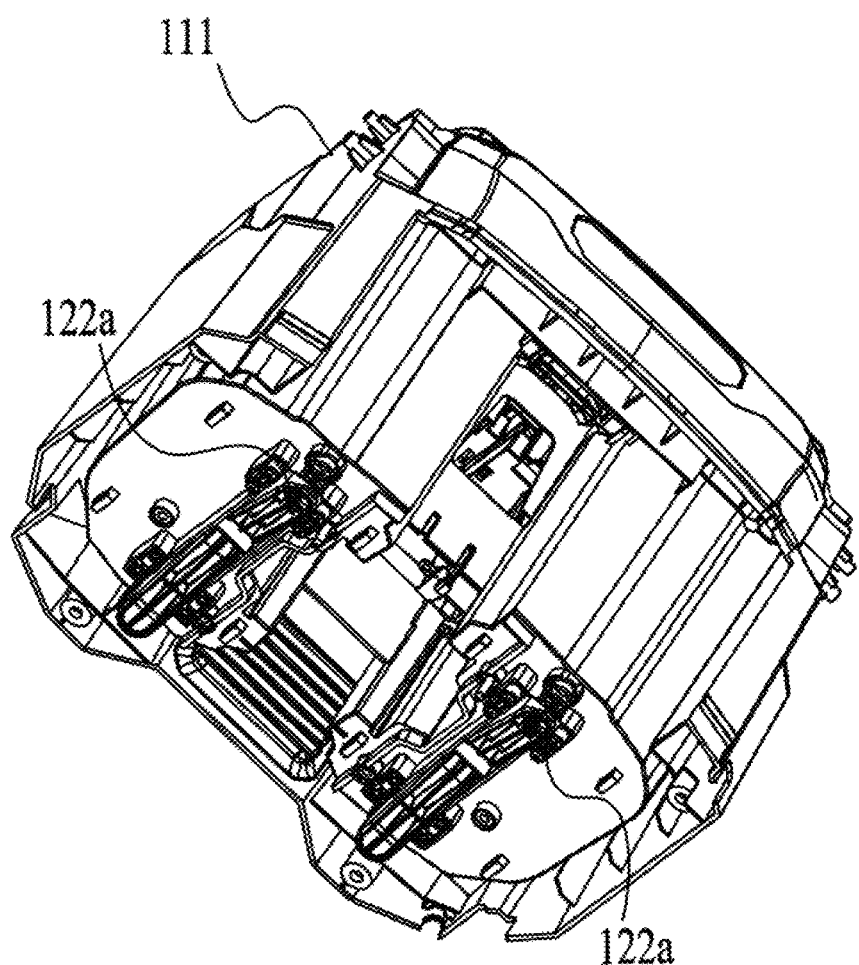
FIG. 5 is a perspective view of a battery pack housing and a biasing member in FIG. 1.

As shown in FIGS. 4 and 5, the energy system 12 includes a battery pack 121. The battery pack 121 may be a single battery pack 121 or multiple battery packs 121. In this example, the energy system 12 includes dual DC lithium battery packs. The body housing 11 includes a battery pack housing 111 for accommodating the battery pack(s) 121. The battery pack housing 111 includes a battery compartment cover 111a and a battery compartment body 111b. The battery compartment cover 111a and the battery compartment body 111b surround the battery compartment to accommodate the battery pack 121. The battery compartment includes a first cavity 111c and a second cavity 111d divided by the battery compartment body 111b, and the two battery packs 121 are mounted to the first cavity 111c and the second cavity 111d, respectively. The battery compartment cover 111a in FIG. 4 is in an open state. The energy system 12 further includes a fixing assembly for fixing the battery pack 121, and the fixing assembly includes a biasing member 122a and a locking member 122b. When the battery packs 121 are mounted to the battery compartment, against the force of the biasing member 122a, the locking member 122b fixes the battery packs 121 to the battery compartment body 111b; when the battery packs 121 are to be detached from the battery compartment, just unlock the locking member 122b, the biasing force generated by the biasing member 122a will automatically eject the battery packs 121. The battery compartment cover 111a and the battery compartment body 111b form a rotatable connection, and the angle at which the battery compartment cover 111a can rotate relative to the battery compartment body 111b is greater than or equal to 0 degrees and less than or equal to 180 degrees. In addition, when the battery compartment cover 111a is in a closed state, it is fixedly connected with the battery compartment body 111b through locking elements, etc. The battery pack 121 includes a power indicator lamp 121a for displaying the power of the battery pack 121, and the power indicator lamp 121a is disposed on the battery pack 121.

As shown in FIGS. 6-11, the snow removal system 15 includes an auger 151. The auger 151 is a functional element of the snow removal machine 100 and is configured to churn up the snow on the ground. The auger 151 can rotate about a first axis 101. The auger 151 includes auger blades 151a. The distance from the furthest point on the auger blades 151a from the first axis 101 to the first axis 101 is the radius R1 of the auger 151 (refer to FIG. 9); the radius R1 of the auger 151 is greater than 120 mm and less than or equal to 150 mm; according to the present example, the radius R1 of the auger 151 is about 134 mm. According to the present example, the auger 151 includes two halves of auger assemblies: a left auger assembly and a right auger assembly; each auger assembly includes a plurality of auger blades 151a, each of which is integrally formed.

Figure 6:
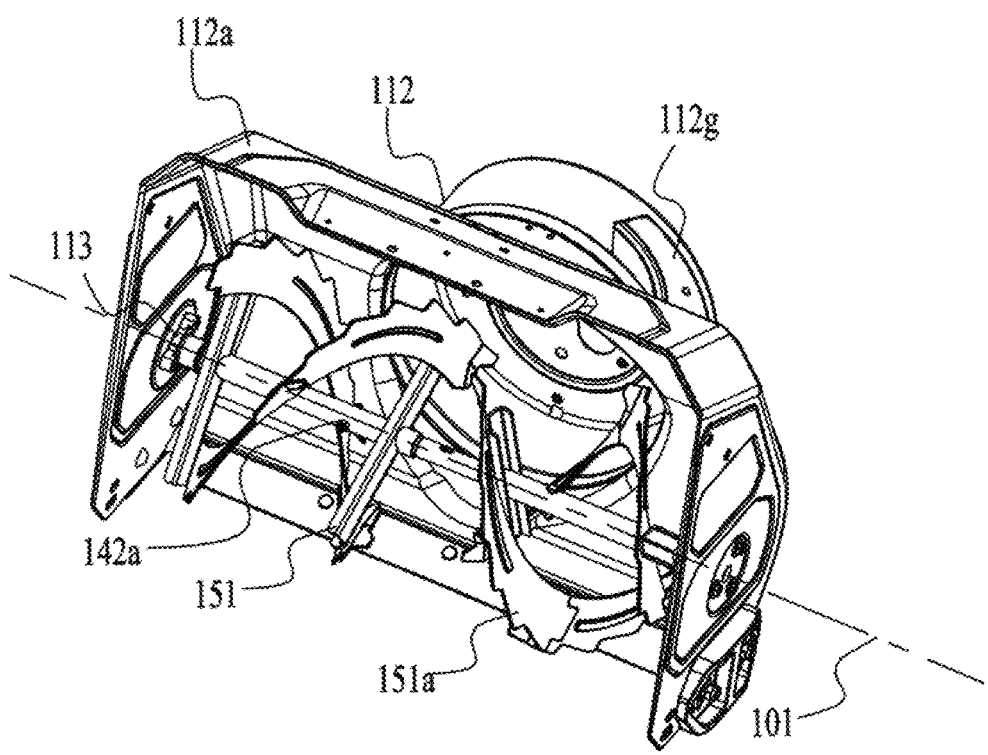
FIG. 6 is a perspective view of a partial structure of a snow removal system of the snow thrower of FIG. 1.
Figure 7:
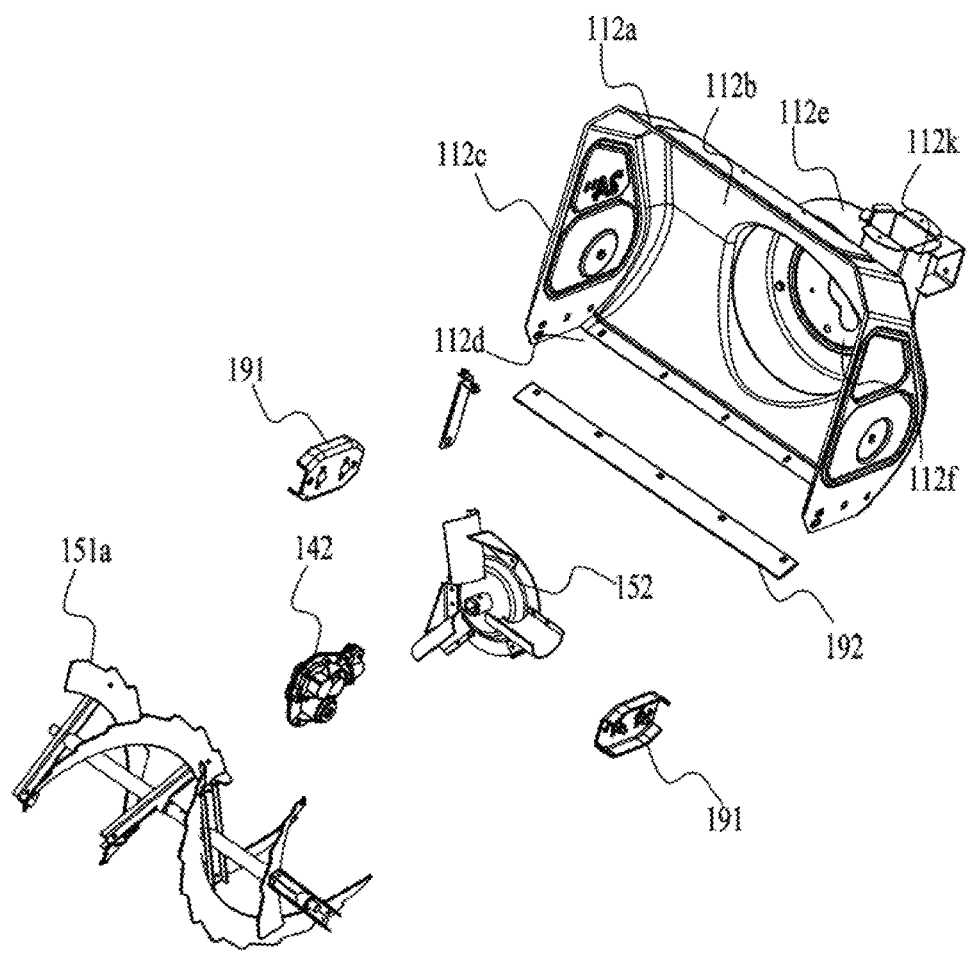
FIG. 7 is an exploded view of the snow removal system of the snow thrower in FIG. 1.
Figure 8:
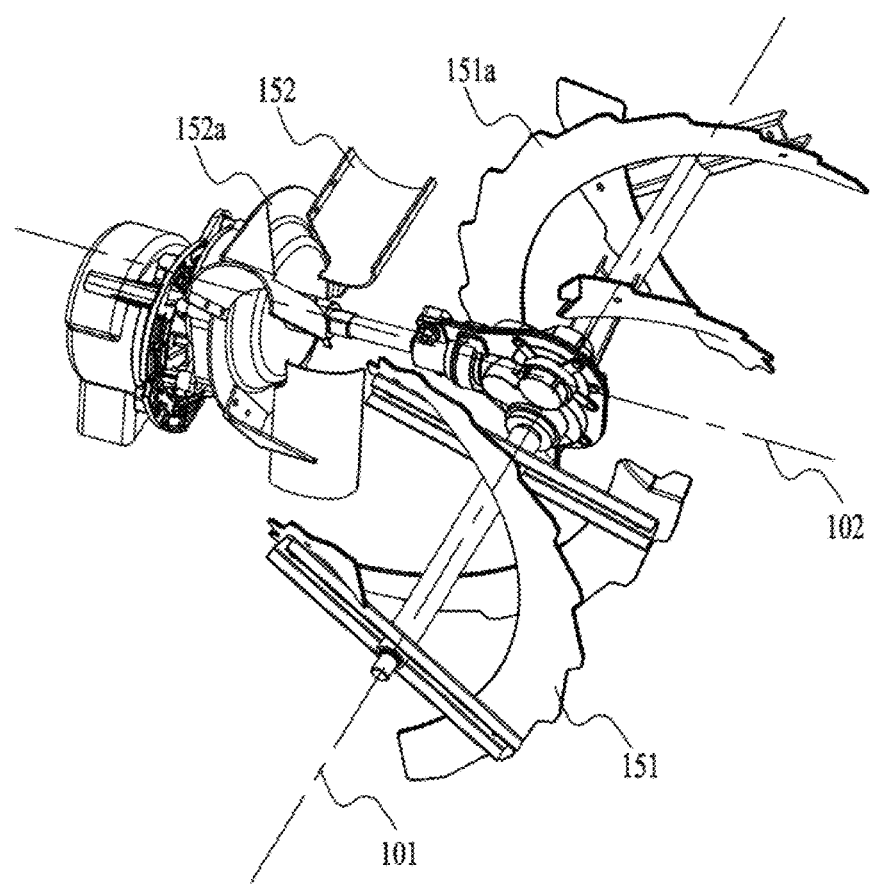
FIG. 8 is a perspective view of a partial structure of the snow removal system and a transmission system in FIG. 1.
Figure 9:
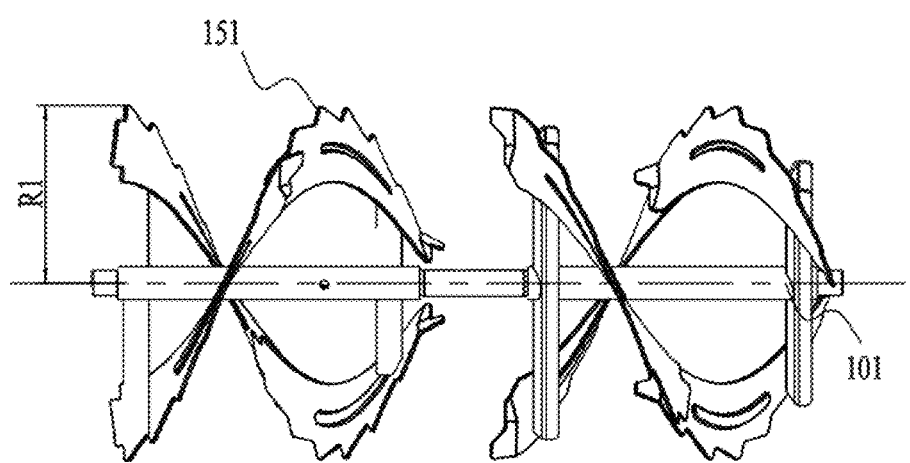
FIG. 9 is a plan view of an auger and a first drive shaft of the snow thrower in FIG. 1.

As shown in FIGS. 6 and 7, a body housing 11 includes a housing 112. The housing 112 is formed with a first accommodating space 112b for accommodating at least part of the auger 151, and a second accommodating space 112f connected with the first accommodating space 112b. In this example, the housing 112 includes an auger housing 112a, and the auger housing 112a is formed with the first accommodating space 112b for accommodating the auger 151. The auger 151 can rotate about the first axis 101 in the auger housing 112a. In one example, the auger housing 112a includes two parallel side walls 112c substantially perpendicular to the ground, and the auger 151 is disposed between the two side walls 112c. The auger housing 112a is formed with a snow inlet 112d to take the snow in, that is, the first accommodating space 112b defines a snow inlet 112d. In the present example, the auger housing 112a is an integrally formed metal structure, and the snow inlet 112d is directed towards the advancing direction of the snow thrower 100. In one example, the auger housing 112a may be integrally formed from non-metallic materials; in other examples, the auger housing 112a may also be assembled from metallic materials and non-metallic materials; In one example, the auger housing 112a may be connected from a plurality of separately formed housing parts, the materials of the plurality of separately formed housing parts may be the same or different.

As shown in FIG. 7, the snow removal system 15 further includes an impeller 152 to further churn up and throw the snow. The housing 112 further includes an impeller housing 112e; the impeller housing 112e is formed with a second accommodating space 112f for at least partially accommodating the impeller 152; the impeller 152 can rotate about a second axis 102 within the housing 112e. The second axis 102 is perpendicular to the first axis 101. In this example, the first accommodating space 112b and the second accommodating space 112f are connected with each other. The first accommodating space 112b is defined with a snow inlet 112d; the second accommodating space 112f is defined with a snow outlet 112g. Under the action of the auger 151, snow enters the auger housing 112a from the snow inlet 112d of the auger housing 112a, and is discharged from the snow outlet 112g after the further action of the impeller 152. In one example, the first accommodating space 112b is larger than the second accommodating space 112f, and along the advancing direction of the snow thrower 100, the first accommodating space 112b is disposed on the front side of the second accommodating space 112f. The second accommodating space 112f has a cylindrical shape. In this example, the auger housing 112a and impeller housing 112e respectively form two separate housings 112, which are mechanically connected together to realize the connection of the first accommodating space 112b and the second accommodating space 112f. In an example, the auger housing 112a and the impeller housing 112e may also be an integrally formed housing 112; in an example, the auger housing 112a and the snow thrower housing 112e may also be formed by connecting multiple separately formed housing 112 parts. In this example, the housing 112 further includes a snow chimney 112k projected from the second accommodating space 112f; the snow chimney 112k substantially extends along a tangential direction of the cylinder; the snow chimney 112k is connected to the snow outlet 112g; the space surrounded by the snow chimney 112k connects with the second accommodating space 112f. The auger housing 112a, the impeller housing 112e and the snow chimney 112k are stamping parts which are connected as a whole by welding.

Figure 10:
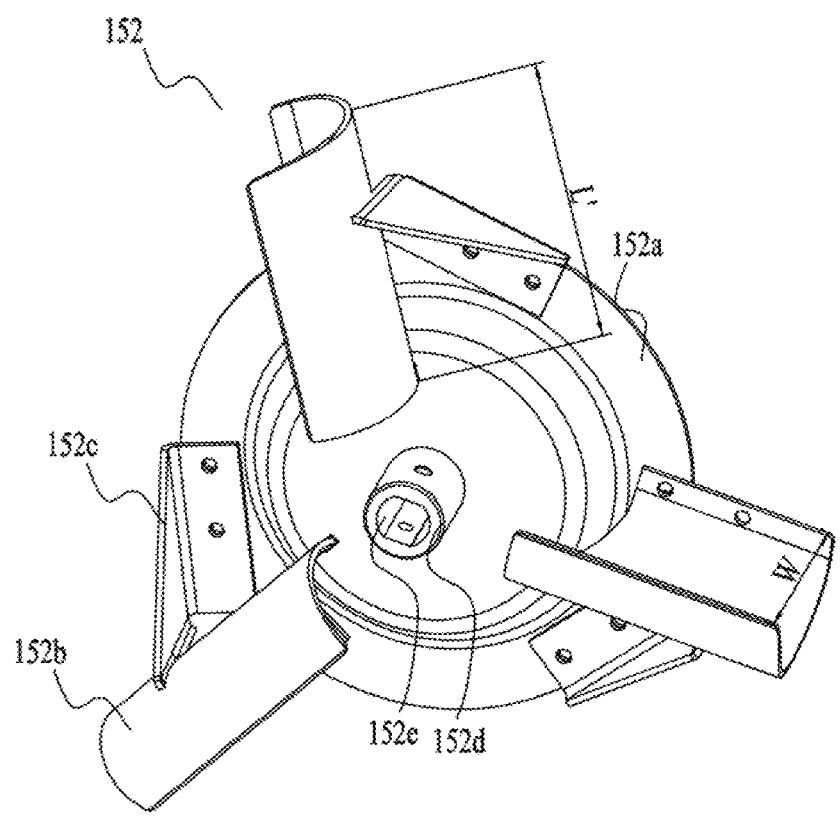
FIG. 10 is a perspective view of an impeller in FIG. 1.

As shown in FIG. 10, the impeller 152 includes an impeller base 152a and impeller blades 152b mounted to the impeller base 152a. The impeller blades 152b are evenly mounted to the impeller base 152a along a circumferential direction. In this example, the impeller blades 152b are straight blades. The impeller 152 also includes a support portion 152c configured to support the impeller blades 152b, wherein the support portion 152c contacts the surface of the impeller blades 152b, and both the support portion 152c and the impeller blades 152b are fixedly connected to the impeller base 152a.

Figure 11:
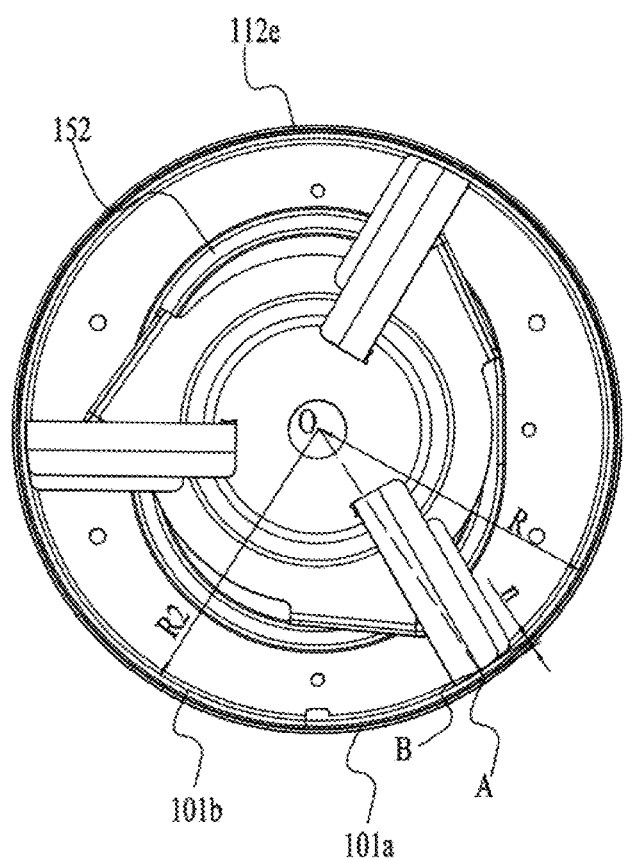
FIG. 11 is a plan view of the impeller and its housing in FIG. 1.

In one example, as shown in FIG. 11, the cross section of the second accommodating space 112f in a plane perpendicular to the second axis 102 is substantially a first circle 101a; the impeller 152 includes a first end near the second axis 102 and a second end away from the second axis 102. When the impeller 152 rotates about the second axis 102, the second end rotates in a second circle 101b. The difference between the radius R of the first circle 101a and the radius R2 of the second circle 101b is greater than or equal to 2 mm and less than or equal to 4 mm. In this example, the difference between the radius R of the first circle 101a and the radius R2 of the second circle 101b is greater than or equal to 2.5 mm and less than or equal to 3.5 mm.

In one example, the line connecting the second axis 102 to any point on the inner wall of the snow thrower housing 112e is a first radial line OA, and the line connecting the second axis 102 to any point on the impeller 152 is a second radial line OB. The first radial line OA and the second radial line OB are all perpendicular to the second axis 102, the first radial line OA partially overlaps the second radial line OB. The minimum value of the difference between the length of the first radial line OA and the length of the second radial line OB is the minimum gap n, which is greater than or equal to 2 mm and less than or equal to 3 mm. In this example, the minimum gap n is greater than or equal to 2 mm and less than or equal to 2.5 mm. That is, when the impeller 152 and impeller housing 112e are not coaxially mounted, the gap between the farthest end of the impeller 152 from the second axis 102 and the inner wall of the impeller housing 112e is not consistent. The minimum gap n is greater than or equal to 2 mm and less than or equal to 3 mm. In one example, the second accommodating space 112f is substantially cylindrical; the impeller 152 is centrally symmetric about the second axis 102.

The aforementioned example makes the gap between the farthest end of the impeller 152 from the second axis 102 and the inner wall of the impeller housing 112e relatively small, in the present example, in other words, it makes the gap between the tip of the impeller blades 152b and the inner wall of the impeller housing 112e relatively small, thereby making snow throwing more efficient. In an example, the radius R2 of the second circle 101b is greater than or equal to 130 mm and less than or equal to 170 mm. In this example, the radius R2 of the second circle 101b is greater than or equal to 140 mm and less than or equal to 160 mm. The dimension L' of the impeller blades 152b in a direction perpendicular to the radial direction of the second axis 102 is greater than or equal to 80 mm and less than or equal to 130 mm; in this example, the dimension L' of the impeller blades 152b in a direction perpendicular to the radial direction of the second axis 102 is greater than or equal to 95 mm and less than or equal to 115 mm. As shown in FIG. 10, the width W of the impeller blades 152b in a direction perpendicular to the radial direction of the impeller blades 152b is greater than or equal to 50 mm and less than or equal to 90 mm; in this example, the width W of the impeller blades 152b in a direction perpendicular to the radial direction of the impeller blades 152b is greater than or equal to 65 mm and less than or equal to 80 mm. In this example, the radius R2 of the second circle 101b is about 150 mm; the dimension L' of the impeller blades 152b in a direction perpendicular to the radial direction of the second axis 102 is about 106 mm; the width W of the impeller blades 152b in a direction perpendicular to the radial direction of the impeller blades 152b is about 75 mm.

As shown in FIGS. 8, 10 and 12-15, the body 10 (FIG. 1) further includes: a walking wheel assembly 16 configured to support the snow thrower 100 so that the snow thrower 100 can walk on the ground; a power system 13 including a first motor 131 and a second motor 132, the first motor 131 being configured to drive the walking wheel assembly 16 to rotate, the second motor 132 being configured to drive the auger 151 to rotate about the first axis 101 and drive the impeller 152 to rotate about the second axis 102; and two battery packs 121 (as shown in FIG. 1) arranged to provide energy for the first motor 131 and the second motor 132. Wherein, the ratio of the sum of the rated capacity of the two battery packs 121 to the rated output power of the second motor 132 is greater than or equal to 0.8 Ah/kw and less than or equal to 8 Ah/kw. In this example, the ratio of the sum of the rated capacity of the two battery packs 121 to the rated output power of the second motor 132 is greater than or equal to 2 Ah/kw and less than or equal to 6 Ah/kw. The ratio of the rated output power of the second motor 132 to the rated output power of the first motor 131 is greater than or equal to 0.03 and less than or equal to 0.3; in this example, the ratio of the rated output power of the second motor 132 to the rated output power of the first motor 131 is greater than or equal to 0.1 and less than or equal to 0.25, which makes the energy distribution of the snow thrower 100 more reasonable and the working efficiency higher. In an example, the output power of the second motor 132 is greater than or equal to 2500 W and less than or equal to 6000 W, and the output rotational speed of the second motor 132 is greater than or equal to 5000 rpm and less than or equal to 15000 rpm. The rotational speed of the impeller 152 is greater than or equal to 500 rpm and less than or equal to 1500 rpm, which ensures that the snow thrower 100 has good snow removal performance.

Figure 12:
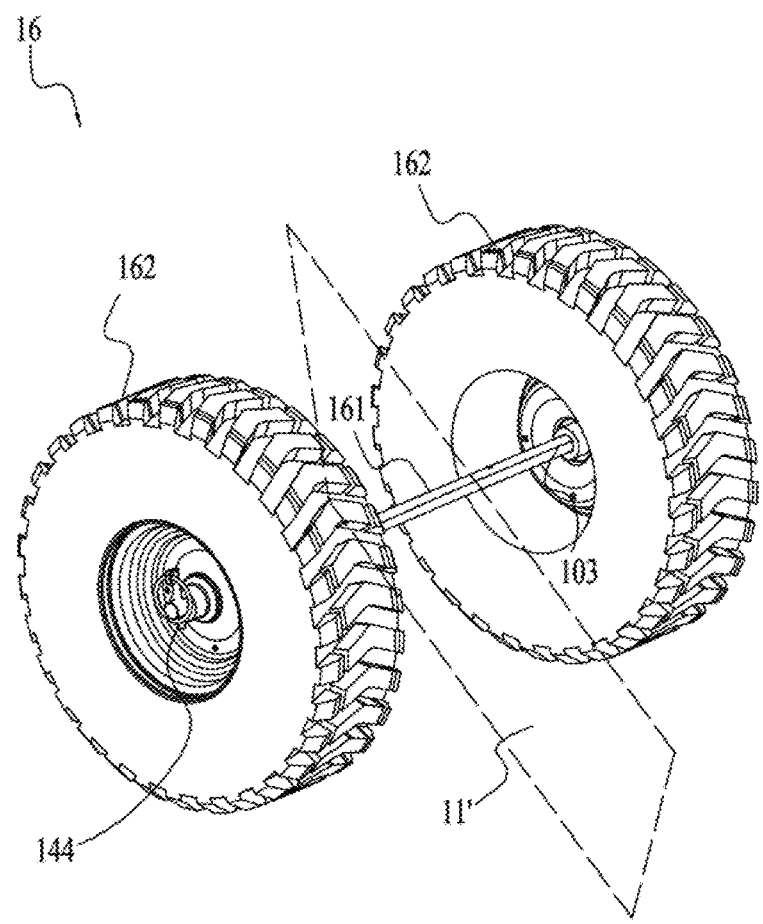
FIG. 12 is a perspective view of a walking wheel assembly of the snow thrower in FIG. 1.

As shown in FIG. 12, the walking wheel assembly 16 includes a walking wheel shaft 161 and at least two walking wheels 162; when the snow thrower 100 travels along a straight line, the two walking wheels 162 are substantially symmetrically arranged on both sides of a first plane 11'; when the snow thrower 100 travels along a straight line, the second axis 102 is within the first plane 11', that is, when the impeller 152 rotates about the second axis 102, the second axis 102 is located in the center position of the walking wheel shaft 161, which makes the weight distribution of the snow thrower 100 more even, and at the same time allows the impeller 152 to throw snow more evenly.

Figure 13:
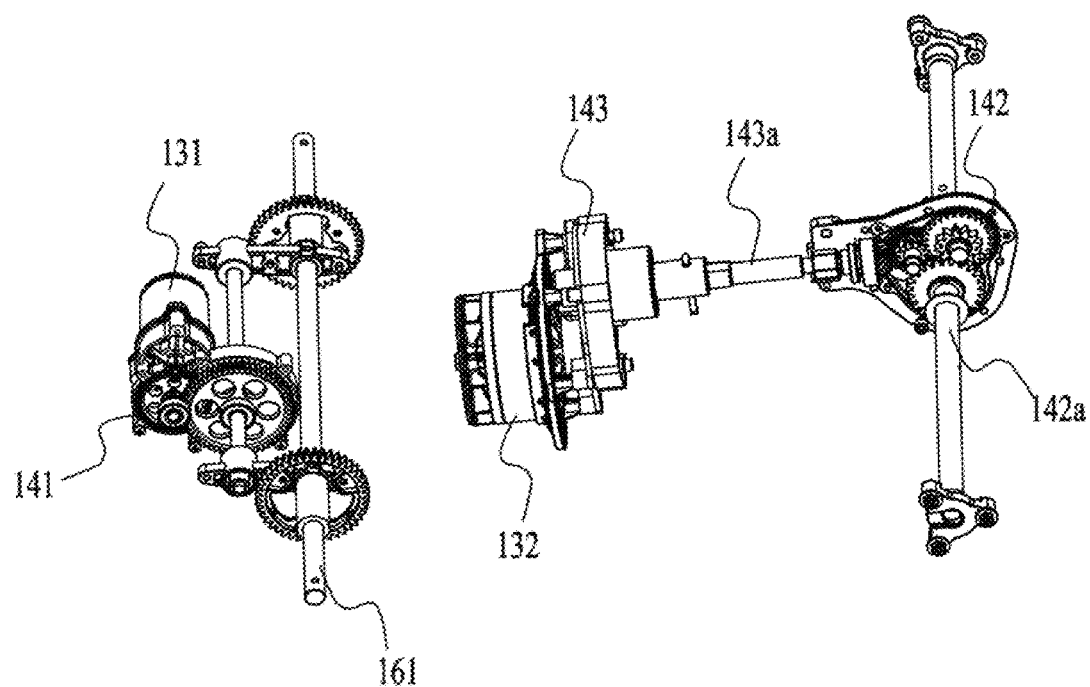
FIG. 13 is a perspective view of a partial structure of the power system and the transmission system of the snow thrower in FIG. 1.

As shown in FIG. 13, the snow thrower 100 further includes a walking transmission assembly 141 for power transmission between the first motor 131 and the walking wheel assembly 16. The walking wheel assembly 16 is connected to the output shaft assembly 141 and is axially positioned by a fastener; the fastener of the present example is a shaft locking pin structure. The walking wheel assembly 16 also includes a differential that makes the two walking wheels 162 rotate at different speeds. The walking transmission assembly 141 includes a gear assembly, and the rotation of the first motor 131 is transmitted to the walking wheel assembly 16 through the gear assembly and a crankshaft. The gear assembly includes a three-stage gear reduction. In this example, the first motor 131 is a brushless motor.

Figure 14:
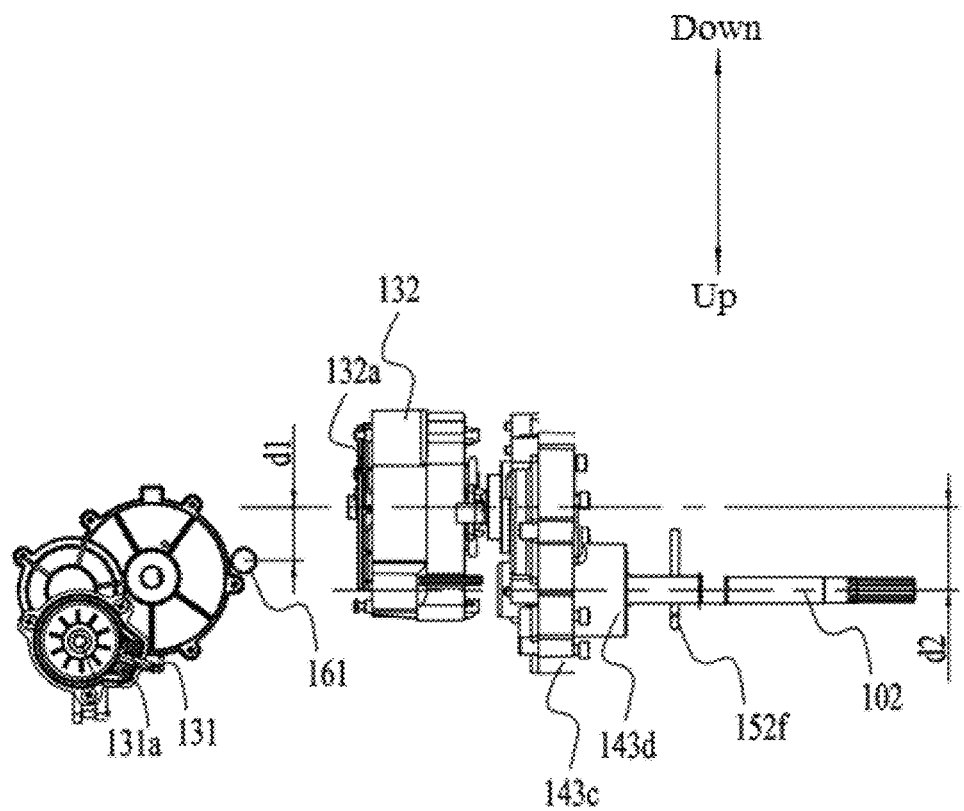
FIG. 14 is a plan view of the partial structure of the power system and the transmission system of the snow thrower in FIG. 1.

As shown in FIG. 14, the first motor 131 includes a first motor shaft 131a that outputs power, and the second motor 132 includes a second motor shaft 132a that outputs power; when the snow thrower 100 travels along a straight line, the axis of rotation of the first motor shaft 131a and the axis of rotation of the second motor shaft 132a are perpendicular to each other. In the advancing direction of the snow thrower 100, the first motor 131 is arranged to the back of the second motor 132. In a vertical direction perpendicular to the walking wheel shaft 161 and perpendicular to the second motor shaft 132a, the vertical distance d1 between the second motor shaft 132a and the walking wheel shaft 161 is greater than or equal to 30 mm and less than or equal to 40 mm; in this example, the vertical distance d1 between the second motor shaft 132a and the walking wheel shaft 161 is about 33 mm. Along this direction, the specific position of the second motor shaft 132a relative to the walking wheel shaft 161 is not limited. In this example, the second motor shaft 132a is located on the lower side of the walking wheel shaft 161. The axis of rotation of the second motor shaft 132a and the second axis 102 about which the impeller 152 rotates are parallel to each other; the specific position of the second motor shaft 132a relative to the second axis 102 is not limited. The distance d2 between the axis of rotation of the second motor shaft 132a and the second axis 102 is greater than or equal to 40 mm and less than or equal to 60 mm. In this example, the distance d2 between the axis of rotation of the second motor shaft 132a and the second axis 102 is about 51.5 mm.

Figure 15:
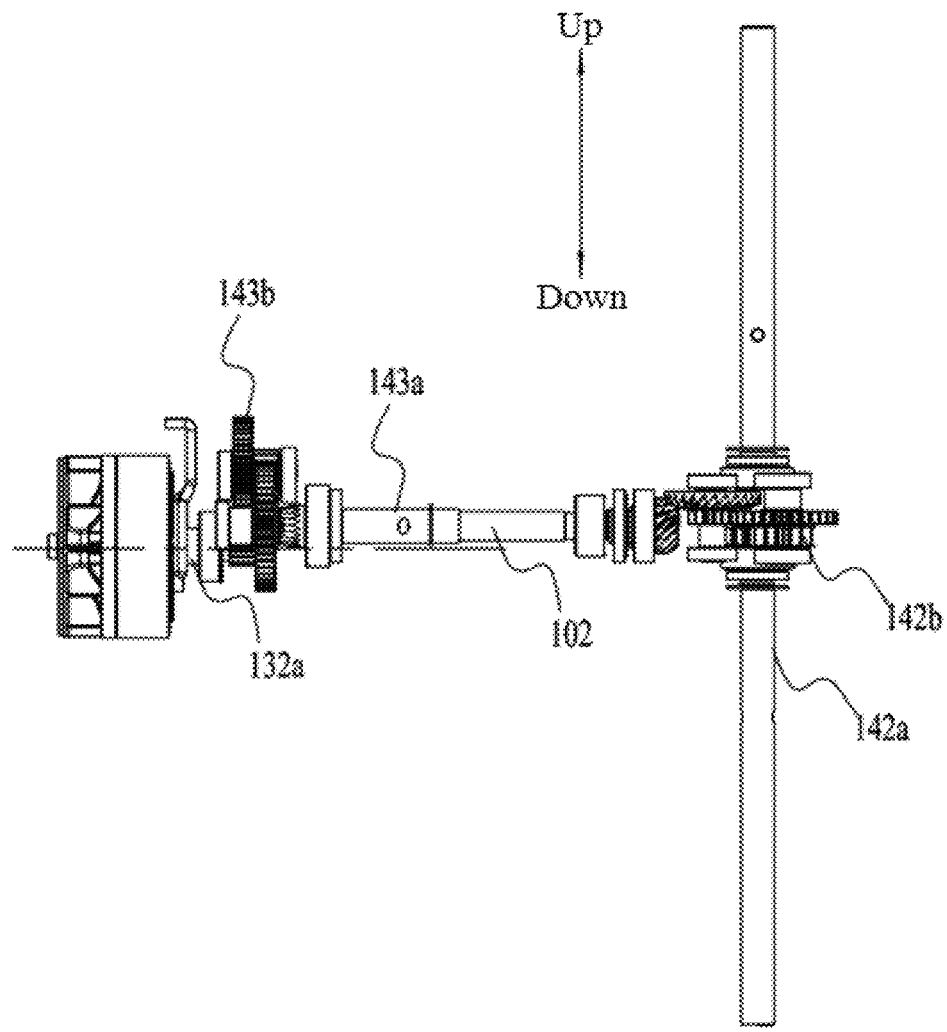
FIG. 15 is a schematic diagram of a second motor, and a first reduction assembly and a second reduction assembly in FIG. 14 with housing removed.
Figure 16:
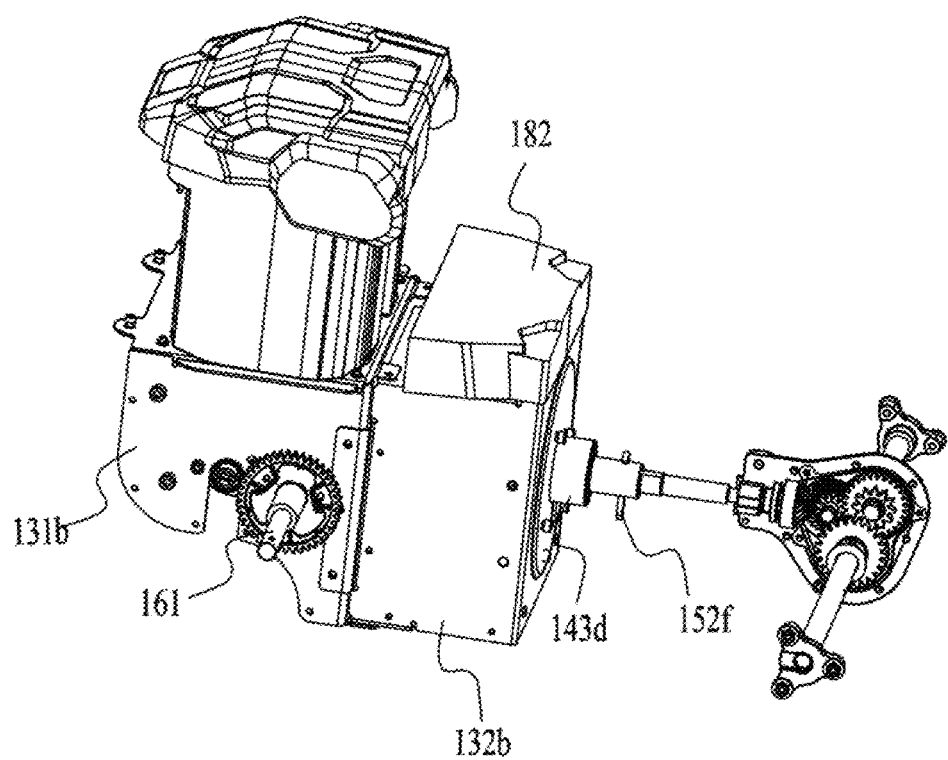
FIG. 16 is a perspective view of a partial structure of the snow thrower in FIG. 1.

As shown in FIG. 15, the snow thrower 100 further includes a first drive shaft 142a and a second drive shaft 143a. The first drive shaft 142a is configured to install the auger 151 and drive the auger 151 to rotate about the first axis 101. The second drive shaft 143a is configured to install the impeller 152 and drive the impeller 152 to rotate about the second axis 102. In one example, the auger blades 151a are mounted to the first drive shaft 142a, and the impeller base 152a is mounted to the second drive shaft 143a. In the up-down direction shown in FIG. 15, the second motor shaft 132a is located on the lower side of the second drive shaft 143a.

As shown in FIG. 10, a mounting portion 152d is formed on the impeller base 152a, and the mounting portion 152d is formed with a transmission throughole 152e for the second drive shaft 143a to pass through and enable the impeller 152 to rotate synchronously with the second drive shaft 143a. In an example, the transmission throughole 152e is a flat hole, and a flat transmission is formed between the second drive shaft 143a and the mounting portion 152d. The snow thrower 100 also includes a pin 152f passing through the mounting portion 152d and the second drive shaft 143a in a direction perpendicular to the second axis 102, so that the mounting portion 152d is relatively fixed with respect to the second drive shaft 143a in the direction of the second axis 102. At the same time, the pin 152f is also arranged to transmit power between the second drive shaft 143a and the mounting portion 152d.

As shown in FIGS. 13 and 15-18, the snow thrower 100 further includes a first reduction assembly 143 and second reduction assembly 142, wherein the first reduction assembly 143 is configured to transmit the power output from the second motor 132 to the second drive shaft 143a. In this example, the first reduction assembly 143 includes a plurality of gears capable of power transmission. The second reduction assembly 142 is configured to realize power transmission between the second drive shaft 143a and the first drive shaft 142a. In other words, the power of the second motor 132 is transmitted to the first drive shaft 142a through the two-stage power transmission of the first reduction assembly 143 and the second reduction assembly 142. The first reduction assembly 143 includes first-type gears 143b for power transmission between the second motor 132 and the second drive shaft 143a; the second reduction assembly 142 includes second-type gears 142b for power transmission between the second drive shaft 143a and the first drive shaft 142a. In this example, the first reduction assembly 143 includes a plurality of first-type gears 143b; the second reduction assembly 142 includes a plurality of second-type gears 142b. One of the plurality of first-type gears 143b is mounted to the second drive shaft 143a and forms a synchronous rotation with the second drive shaft 143a, and the first-type gear 143b mounted on the second drive shaft 143a forms a detachable connection with the second drive shaft 143a. In one example, the first-type gears 143b are spur gears, the second-type gears 142b include both spur gears and bevel gears, and the second drive shaft 143a and the bevel gear are connected by a spline. In this example, the power transmission between the second motor 132, the second drive shaft 143a and the first drive shaft 142a is realized through the first-type gears 143b and the second-type gears 142b, such that the overall structure of the snow thrower 100 is more compact.

The ratio of the output rotational speed of the second motor 132 to the rotational speed of the first drive shaft 142a is defined as the first reduction ratio of the first reduction assembly 143. The first reduction ratio is greater than or equal to 8 and less than or equal to 12. In this example, the first reduction ratio is greater than or equal to 9 and less than or equal to 11. The ratio of the rotational speed of the second drive shaft 143a to the rotational speed of the first drive shaft 142a is defined as the second transmission ratio of the second reduction assembly 142. The second transmission ratio is greater than or equal to 8 and less than or equal to 12. In this example, the second transmission ratio is greater than or equal to 9 and less than or equal to 11.

Figure 17:
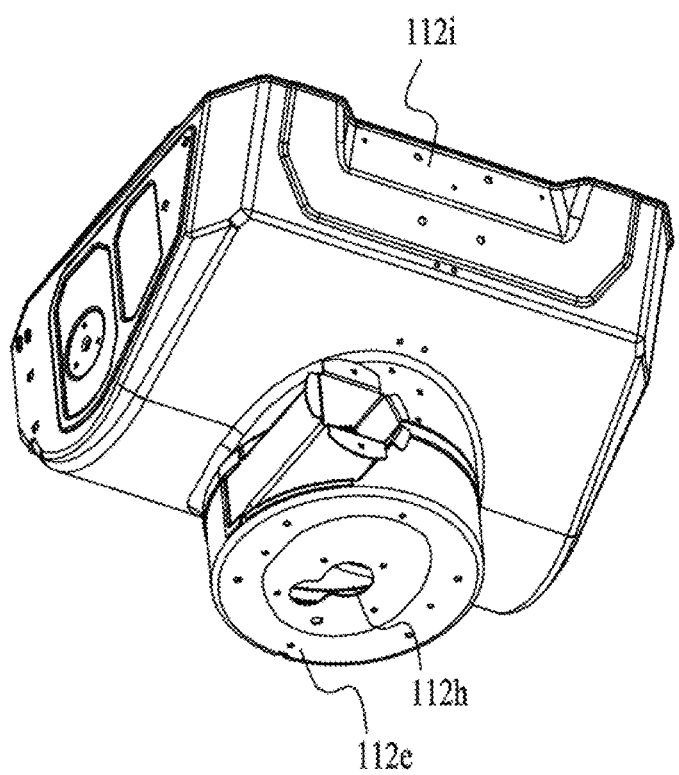
FIG. 17 is a perspective view of a housing of the snow thrower in FIG. 1.
Figure 18:
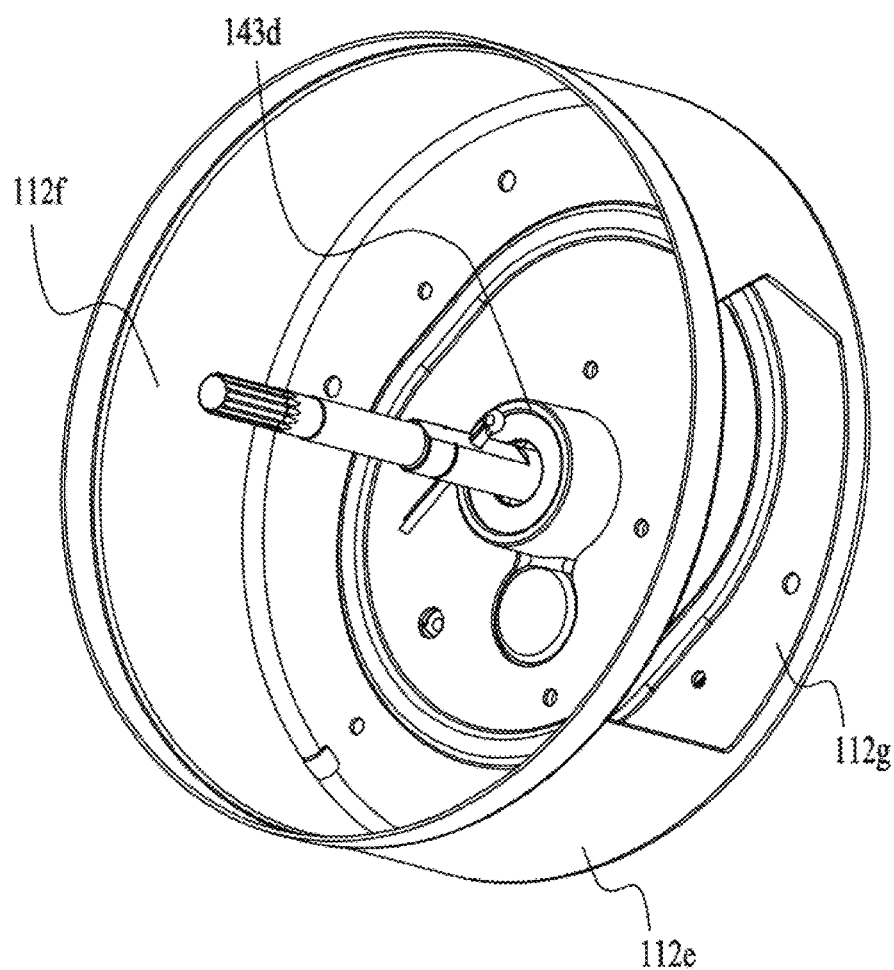
FIG. 18 is a perspective view of the impeller housing, a protrusion and a second drive shaft of the snow thrower in FIG. 1.

As shown in FIGS. 14 and 17, the snow thrower 100 further includes a first reduction gearbox 143c that houses the first reduction assembly 143, the first reduction gearbox 143c is formed with a projection 143d, and the impeller housing 112e is formed with a through hole 112h through which the projection 143d can be inserted into the second accommodating space 112f, and the hole wall of the through hole 112h engages with the outer wall of the projection 143d to realize the positioning of the impeller housing 112e relative to the first reduction gearbox 143c. That is, at least part of the first reduction gearbox 143c extends into the interior of the second accommodating space 112f, and the first gear box 143c and the impeller housing 112e are positioned by fitting the shaft hole to ensure that the first reduction gearbox 143c does not move substantially relative to the impeller housing 112e along the radial direction of the second axis 102. In an example, the outer wall of the projection 143d is substantially a cylinder, the through hole 112h is a circular hole for the projection 143d to pass through, and the radius of the circular hole is substantially the same as the radius of the cylinder.

Figure 19:
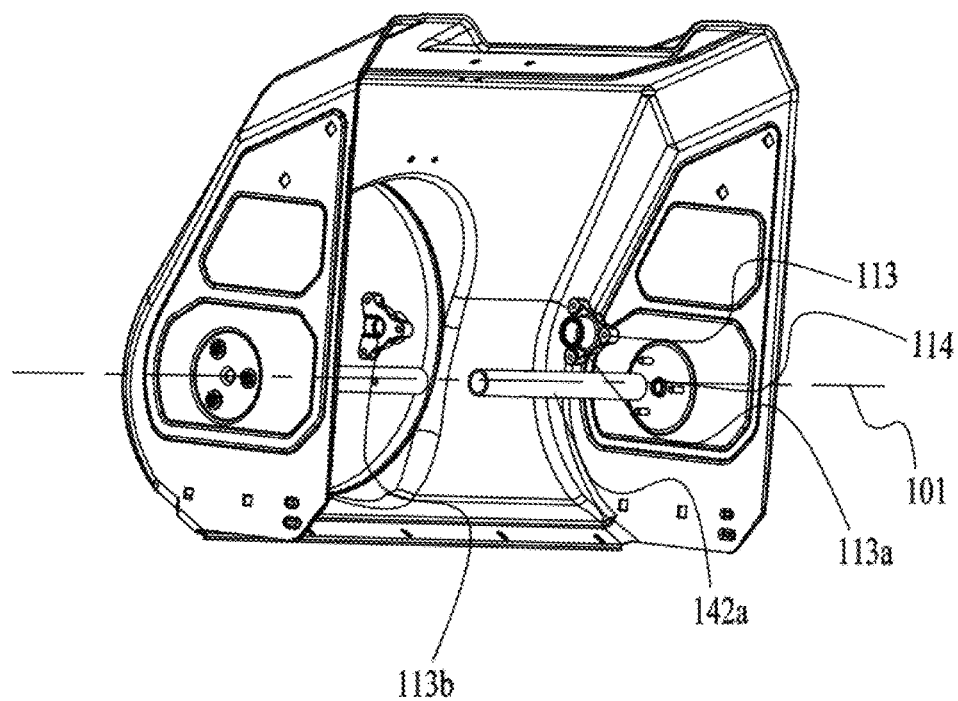
FIG. 19 is a schematic structural diagram of an auger housing, a connecting piece and part of the first shaft member of the snow thrower in FIG. 1.

As shown in FIGS. 6 and 19, the snow thrower 100 further includes a connecting piece 113 provided to connect the first drive shaft 142a and the auger housing 112a; the connecting piece 113 is further formed with a connecting hole 113a for the first drive shaft 142a to insert. Wherein the auger housing 112a is further formed with a positioning portion 114 to position the connecting piece 113, and the connecting piece 113 is formed with a mating portion 113b to engage with the positioning portion 114. The mating portion 113 b is formed with a mating groove, and the positioning portion 114 is inserted into the mating groove. The mating groove is configured to guide the connecting piece 113 to be coupled to the positioning portion 114 in a direction perpendicular to the first axis 101. In one example, the positioning portion 114 protrudes toward the inside of the auger housing 112a along the direction of the first axis 101 and is cylindrical. The mating groove includes a circular groove recessed to the inside of the connecting piece 113 and a rectangular groove substantially tangent to the circular groove. The positioning portion 114 can slide in along the rectangular groove and then cooperate with the circular groove to realize the positioning of the connecting piece 113 and the auger housing 112a. Then, just rotate the connecting piece 113 about the first axis 101, align the screw holes on the connecting piece 113 with the screw holes on the auger housing 112a, and screw the screws to install the connecting piece 113.

Figure 20:
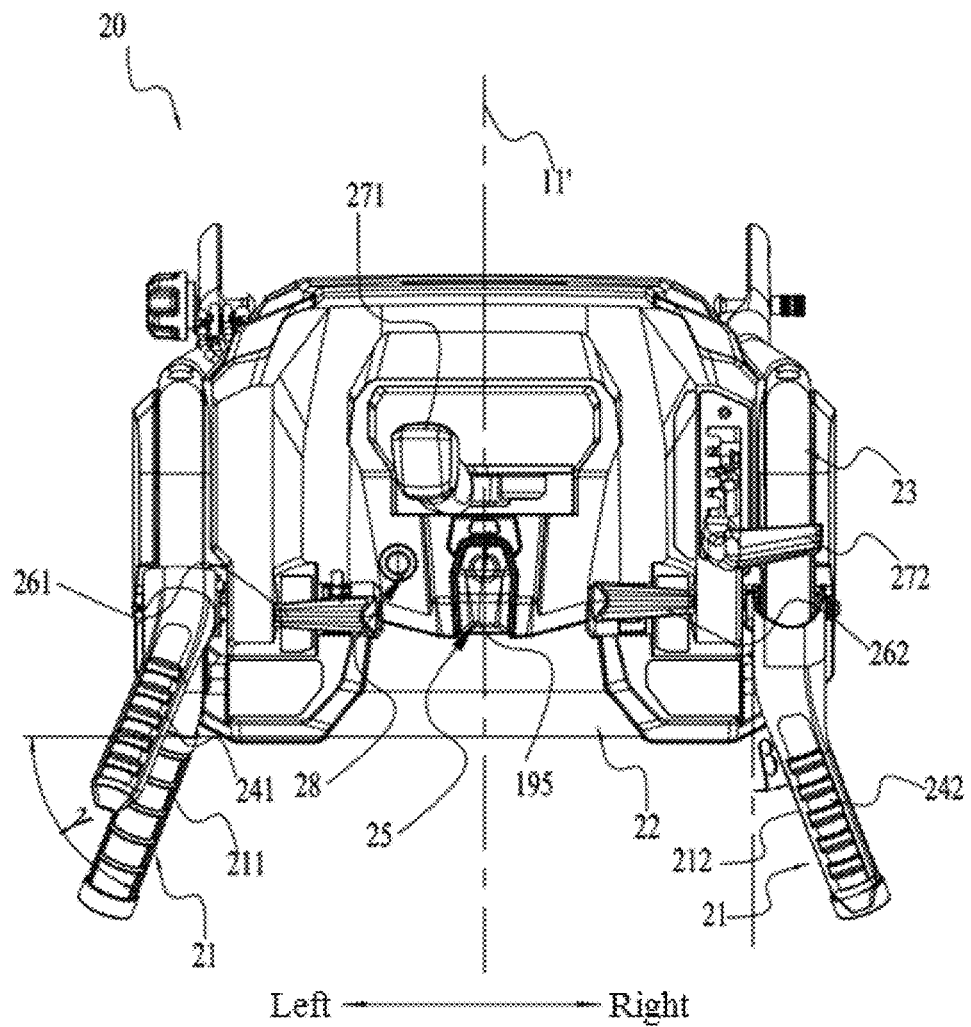
FIG. 20 is a top view of an operating assembly of the snow thrower in FIG. 1.
Figure 21:
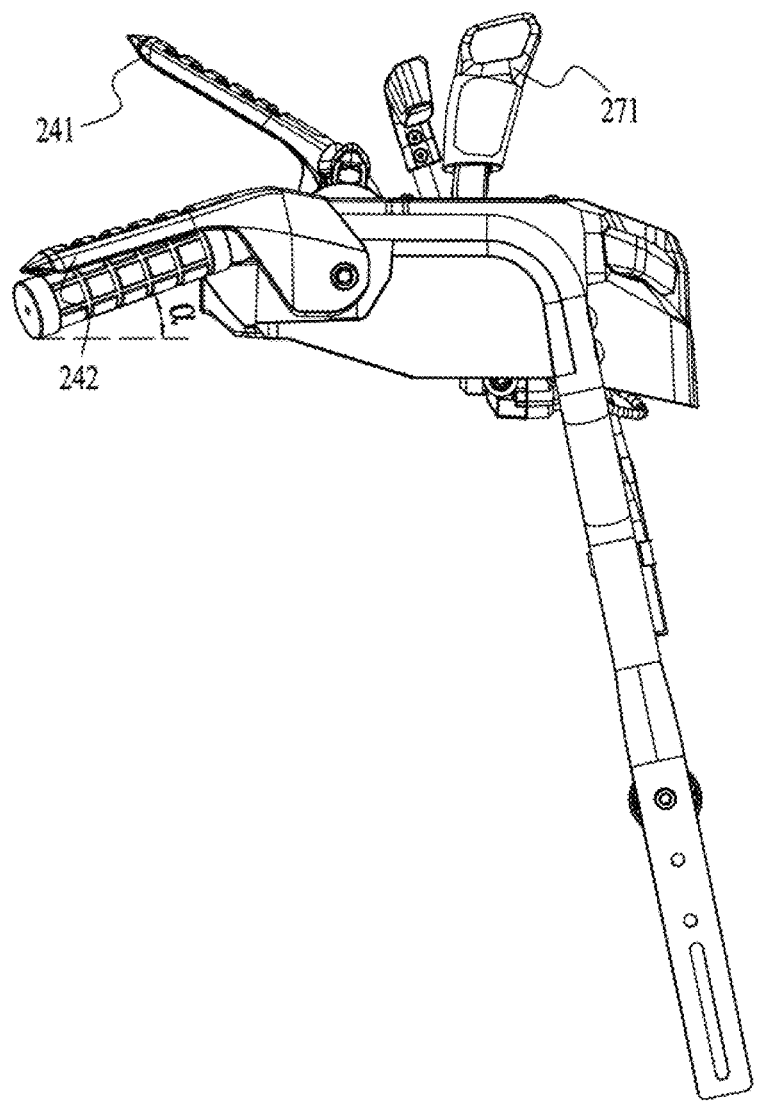
FIG. 21 is a side view of the operating assembly of the snow thrower in FIG. 1.
Figure 22:
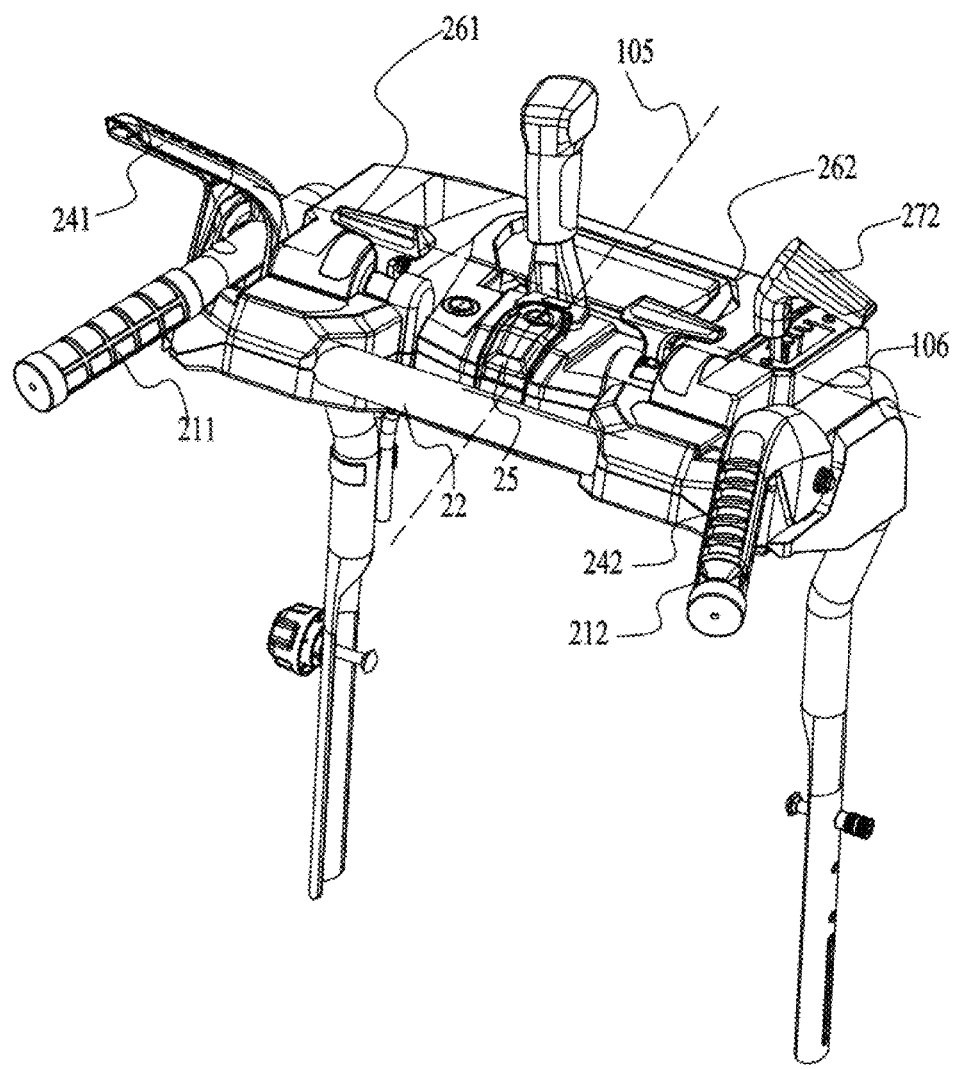
FIG. 22 is a side perspective view of the operating assembly of the snow thrower in FIG. 1.
Figure 23:
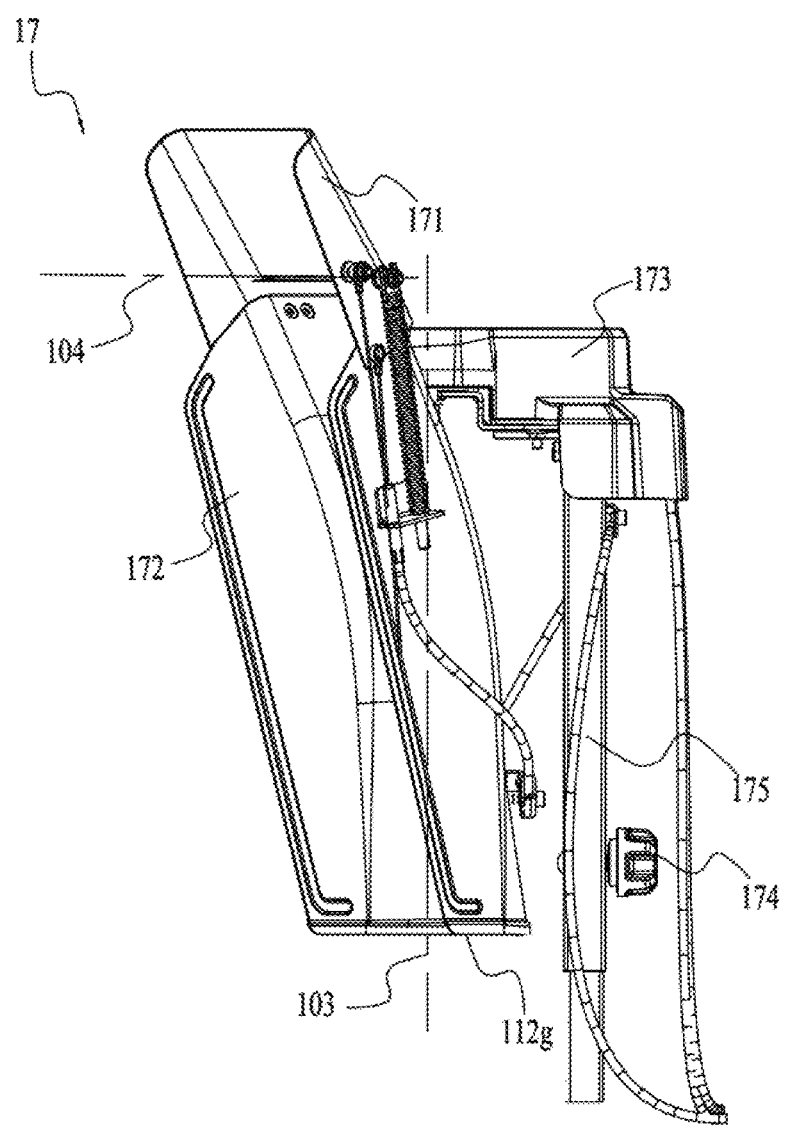
FIG. 23 is a perspective view of the snow throwing system of the snow thrower in FIG. 1.

As shown in FIGS. 20-22, the operating assembly 20 includes an operating handle 21 for a user to operate. Two operating handles 21 are respectively provided on the left side and the right side, and the two operating handles 21 are respectively formed with a first grip portion 211 and a second grip 212 for the user to grasp. In order to facilitate the user to grasp, the first grip portion 211 is inclined outward and downward. When the snow thrower 100 is on a ground parallel to the horizon, the angle α formed between the extension direction of the first grip portion 211 and the horizon is greater than or equal to 10 degrees and less than or equal to 40 degrees, and the angle β formed between the extension direction of the first grip portion 211 and the vertical surface is greater than or equal to 10 degrees and less than or equal to 30 degrees. In an example, the first grip portion 211 and the second grip portion 212 are symmetrically arranged about the first plane 11'. Similar to the first grip portion 211, the second grip portion 212 is also inclined outward and downward. When the snow thrower 100 is located on a ground parallel to the horizon, the angle α formed between the extension direction of the second grip portion 212 and the horizon is greater than or equal to 10 degrees and less than or equal to 40 degrees, and the angle β formed between the extension direction of the second grip portion 212 and the vertical surface is greater than or equal to 10 degrees and less than or equal to 30 degrees.

The operating assembly 20 also includes a rear pull handle 22 and an operating console 23. The rear pull handle 22 is operated by the user to pull the snow thrower 100 backwards, and the rear pull handle 22 is mounted to the operating console 23. When the snow thrower 100 is on a ground parallel to the horizon, the projection of the rear pull handle 22 in a plane parallel to the horizon extends along a first straight line direction, and the projection of the first grip portion 211 in said plane is along a second straight line. The first straight line and the second straight line intersect and form an angle γ greater than or equal to 60 degrees and less than or equal to 80 degrees. In this example, the first straight line and the second straight line intersect and form an angle γ greater than or equal to 65 degrees and less than or equal to 75 degrees.

The operating assembly 20 further includes a first trigger 241 and a second trigger 242, the first trigger 241 is configured to be operated by the user to control the first motor 131; the second trigger 242 is configured to be operated by the user to control the second motor 132. In this regard, a trigger is simply any device that is usable to trigger an action/event. The first trigger 241 is connected to the first grip portion 211, and the second trigger 242 is connected to the second grip portion 212. For the convenience of description, the left and right directions are defined as shown in FIG. 20 according to the position when the user faces the operating assembly 20 to operate the snow thrower 100. In this example, the left trigger is the first trigger 241 and the right trigger is the second trigger 242, but the absolute positions of the first trigger 241 and the second trigger 242 are not limited. In this example, the left and right operating handles 21 are substantially symmetric about the first plane 11', and the first trigger 241 and the second trigger 242 are substantially symmetric about the first plane 11'.

The first trigger 241 and the second trigger 242 each have at least two states: a released state and a triggered state. Trigger the first trigger 241 to start the first motor 131 and trigger the second trigger 242 to start the second motor 132. In FIGS. 20-22, the first trigger 241 is in the released state and the second trigger 242 is in the triggered state. When the first trigger 242 and the second trigger 241 are in the triggered state, the user can hold the operating handle 21 with one hand while keeping the first trigger 241 or the second trigger 242 in the triggered state. The electrical or mechanical connection between the first trigger 241 and the second trigger 242 enables the first trigger 241 and the second trigger 242 to have or compose control logic as predetermined. In this example, the control logic of the first trigger 241 and the second trigger 242 is as follows: if the second trigger 242 is triggered separately and then released, the second trigger 242 is reset and rebounds; if the first trigger 241 is triggered separately and then released, the first trigger 241 is reset and rebounds; when the first trigger 241 and the second trigger 242 are triggered at the same time, if only the first trigger 241 is released, the first trigger 241 is reset and rebounds, if only the second trigger 242 is released, the second trigger 242 is not reset and does not rebound, if both the first trigger 241 and the second trigger 242 are released, the second trigger 242 is reset and rebounds, so does the first trigger 241. A connection mechanism is also provided between the first trigger 241 and the second trigger 242 to form an electrical connection or a mechanical connection there between to realize the aforementioned control logic. In this example, the first trigger 241 and the second trigger 242 are connected by a mechanical structure.

Figure 26:
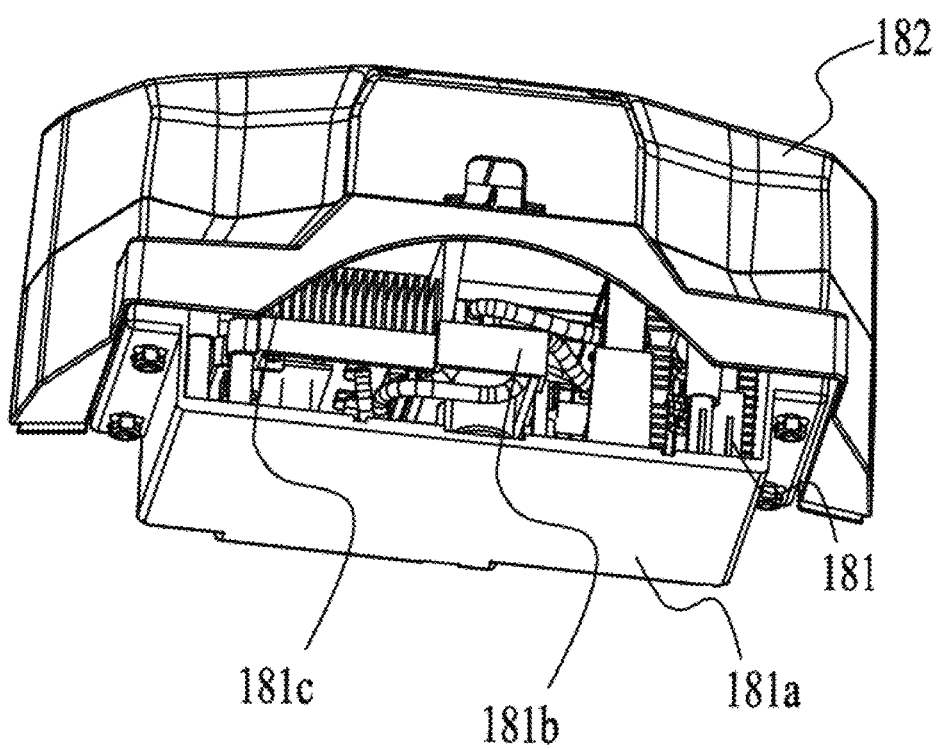
FIG. 26 is a perspective view of a circuit board assembly and the circuit board housing of the snow thrower in FIG. 1.

The operating assembly 20 further includes a safety switch 25, and the second trigger 242 is connected to the safety switch 25, and the safety switch 25 is mounted to the operating console 23. The safety switch 25 is electrically or communicatively connected to a circuit board assembly 181 (as shown in FIG. 26). The snow thrower 100 is equipped with a dual-switch start to improve the operational safety of the snow thrower 100: to start the snow thrower 100, the safety switch 25 must be triggered first, and then the second trigger 242 needs to be triggered within a predetermined time, the predetermined time is generally 3 to 10 seconds. To turn off the snow thrower 100, only the second trigger 242 needs to be released.

As shown in FIG. 22, the operating assembly 20 further includes a first speed control switch 261 and a second speed control switch 262. The first speed control switch 261 adjusts the speed of the first motor 131; the second speed control switch 262 adjusts the speed of the second motor 132; wherein, the first speed control switch 261 and the second speed control switch 262 are arranged on the operating console 23. Both the first speed control switch 261 and the second speed control switch 262 can rotate with respect to the operating console 23, and the axis of rotation of the first speed control switch 261 and the axis of rotation of the second speed control switch 262 are parallel or coincide with each other. The safety switch 25 is provided between the first speed control switch 261 and the second speed control switch 262.

The first speed control switch 261 has a forward gear and a reverse gear; when the first speed control switch 261 is in the forward gear, and the first trigger 241 is triggered, the snow thrower 100 moves forward; when the first speed control switch 261 is in the reverse gear, and the first trigger 241 is triggered, the snow thrower 100 moves backward. The snow thrower 100 further includes a control circuit, wherein the control circuit 241, the first speed control switch 261 and the first motor 131 are electrically connected. When the first speed control switch 261 is switched from the forward gear to the reverse gear after the first trigger 241 is triggered, the control circuit controls the first motor 131 to stop rotating.

In this example, the control scheme for controlling the forward and backward movement of the walking wheel assembly 16 is as follows: the first speed control switch 261 includes a sliding rheostat. The sliding rheostat of the first speed control switch 261 adopts stepless speed regulation. The first speed control switch 261 has a forward gear, a reverse gear and a neutral gear. The operation logic is as follows: the control circuit receives the voltage value signal from the first speed control switch 261, determines the intention of the operator, and matches the voltage value range to corresponding walking speed set in advance, for example, 0 mv-2500 mv proportionally corresponds to forward gear 0 m/s-1.2 m/s; 2501 mv-4000 mv corresponds to neutral (zero speed); and 4001 mv-5000 mv proportionally corresponds to the reverse gear 0 m/s-0.2 m/s. The steps are as follows:
1. Choose a desired gear and then press the first trigger 241, the machine will move forward or backward or stay in the neutral gear;
2. When the first trigger 241 has been pressed, release the first trigger 241 to the stop the machine;
3. When the first trigger 241 has been pressed and the machine is moving forward, in the desire to move backward, only changing the first speed control switch 261 to the reverse gear will make the machine stop instead of moving backward. The user must first release the first trigger 241, adjust the backward speed and then press the first trigger 241 again to move backward;
4. Similarly, follow the analogy of step 3 to go forward when the machine is moving backward.

The second speed control switch 262 includes a sliding rheostat configured to exert constant speed control over the auger 151 with five speed gears of: 1100 rpm, 1000 rpm, 900 rpm, 800 rpm, and 700 rpm. The operating logic is as follows: the control circuit receives the voltage value signal from the first speed control switch 261, determines the intention of the operator, and matches the voltage value range to corresponding rotational speed range set in advance, for example, 0 mv-1000 mv corresponds to a rotation speed of 700 rpm; 1001 mv-2000 mv corresponds to a rotational speed of 800 rpm; 2001 mv-3000 mv corresponds to a rotation speed of 900 rpm; 3001 MV-4000 mv corresponds to a rotational speed of 1000 rpm; and 4001 MV-5000 mV corresponds to a rotational speed of 1100 rpm.

The operating assembly 20 also includes a first detection unit and a second detection unit. The first detection unit detects the signal and transmits the signal to the circuit board assembly 181 to control the first motor 131 to move forward or backward. The first detection unit, the first speed control switch 261, the circuit board assembly 181 are electrically or communicationally connected. The second detection unit detects the signal and transmits the signal to the circuit board assembly 181 to control the rotational speed of the auger 151. The second detection unit forms an electrical connection or a communication connection with the second speed control switch 262 and the circuit board assembly 181. In this example, both the first detection unit and the second detection unit are signal switches.

As shown in FIGS. 6 and 20-24, the snow throwing system 17 of the snow thrower 100 includes a snow outlet portion 171, a snow throwing portion 172, a snow throwing transmission assembly 173, a locking assembly 174 and a supporting rod 175. Wherein the snow throwing portion 172 surrounds a semi-closed channel and defines an opening; a first end of the snow throwing portion 172 is rotatably connected to the housing 112 to connect the second accommodating space 112f to the outside. The snow throwing portion 172 and the housing 112 form a rotatable connection with a third axis 103 as the axis of rotation (refer to FIG. 23), and the third axis 103 is perpendicular to the ground. The snow outlet portion 171 is mounted to a second end of the snow throwing portion 172, according to the present example, the snow outlet portion 171 is mounted to the top of the snow throwing portion 172, the snow outlet portion 171 forms a rotatable connection relative to the snow throwing portion 172 with a fourth axis 104 as the axis of rotation. The third axis 103 is perpendicular to the fourth axis 104.

After being processed by the impeller 152 and thrown from the snow outlet 112g, the snow passes through the snow throwing portion 172 and the snow outlet portion 171 and is thrown into the air. In this example, the whole formed by the snow throwing portion 172 and the snow outlet portion 171 can rotate about the third axis 103 in a plane parallel to the ground, and the rotatable angle range is about 0°-200°. The rotatable range of the snow throwing portion 172 to the left and right sides is about 0°-100°. The snow outlet portion 171 can rotate relative to the snow throwing portion 172 about the fourth axis 104 in a plane perpendicular to the ground, and the rotatable angle range is about 0°-65°. The ground in this example refers to any plane on which the snow thrower 100 is placed. The snow throwing portion 172 extends along an arc. The snow throwing portion 172 is formed with a chute-like structure along its extending direction. The first end of the chute-like structure is connected with the snow outlet 112g, and the second end is connected with the snow outlet portion 171. The snow throwing portion 172 is made of stamping materials. The snow outlet 171 also has a chute-like structure, the first end of the snow outlet 171 is connected with the snow throwing portion 172, and the second end of the snow outlet 171 is connected with the outside. The snow outlet portion 171 is also formed with an opening, and when the snow outlet portion 171 is attached to the snow throwing portion 172, the direction of the opening of the snow outlet portion 171 is the same as the direction of the opening of the snow throwing portion 172. In other words, the snow throwing portion 172 connects the housing 112 and the snow outlet portion 171 to form a continuous channel for snow removal.

The snow throwing transmission assembly 173 includes a gear structure composed of at least two gears and a spool, which are configured to adjust the direction of the snow throwing portion 172. In this example, the gear modulus m=3 and the number of teeth z=20/32. In addition, the supporting rod 175 is configured to support the snow throwing transmission assembly 173, and the supporting rod 175 is connected to the housing 112. In one example, the supporting rod 175 is composed of a first rod and a second rod. The first rod and the second rod are locked by the locking assembly 174 and form a detachable connection, so that the snow throwing system 17 can be disassembled from the snow thrower 100, which eases transportation and saves storage space.

As shown in FIGS. 21 and 22, the operating assembly 20 further includes a first steering handle 271 and a second steering handle 272, wherein the first steering handle 271 is connected to the snow throwing portion 172 to adjust the direction of the opening, and the second steering handle 272 is connected to the snow throwing portion 172 to adjust the portion of the snow outlet portion 171 with respect to the snow throwing position 172. The first steering handle 271 forms a rotatable connection with the operating console 23 about a fifth axis 105; the second steering handle 272 forms a rotatable connection with the operating console 23 about a sixth axis 106. The fifth axis 105 is perpendicular to the third axis 103, so that when the user operates the first steering handle 271, the rotation direction of the first steering handle 271 and the rotation direction of the snow throwing portion 172 both have a vector perpendicular to the first plane 11', which serves as an indication to the user, and conforms to ergonomic designs. Similarly, when the openings of the snow throwing portion 172 and the snow outlet portion 171 are parallel to the advancing direction of the snow thrower 100, the sixth axis 106 is parallel to the fourth axis 104, which makes both the rotation direction of the second steering handle 272 and the rotation direction of the snow outlet portion 171 parallel to the first plane 11', thereby providing an indication to the user, which conforms to ergonomic designs.

As shown in FIGS. 3 and 24-27, the snow thrower 100 further includes a circuit board assembly 181, a circuit board housing 182, and a motor housing. The circuit board assembly 181 is electrically connected to the first motor 131 and the second motor 132, and the circuit board housing 182 surrounds a receiving cavity in which the circuit board assembly 181 can be disposed. A waterproof box is installed on the upper part of the circuit board housing 182, and a plurality of circuit boards are installed in the circuit board housing 182, such as a power board, a power management board, a walking control board, a light control board, and a main control board. The circuit board housing 182 is arranged between the battery pack 121 and the impeller housing 112e. The motor housing is formed with a receiving cavity for accommodating the second motor 132. The motor housing is arranged on the lower side of the circuit board housing 182. The motor housing is arranged between the housing 112 and the battery pack 121, and the circuit board housing 182 is arranged between the housing 112 and the battery pack 121. In other words, along the direction parallel to the second axis 102, the motor housing and the circuit board housing 182 are both disposed between the battery pack 121 and the housing 112. This makes the wires shorter, saves raw materials and the space of the whole machine, and makes the overall structure more concise. Along a vertical direction perpendicular to the second axis 102, the motor housing is disposed on the lower side of the circuit board housing 182, so that the center of gravity of the snow thrower 100 is more stable, and at the same time, the snow thrower 100 gets more sufficient heat dissipation. The motor housing is fixedly connected to the housing 112 by fasteners. In an example, the motor housing is fixedly connected to the impeller housing 112e by screws. The circuit board housing 182 is fixedly connected or detachably connected with the motor housing through fasteners such as screws.

Figure 24:
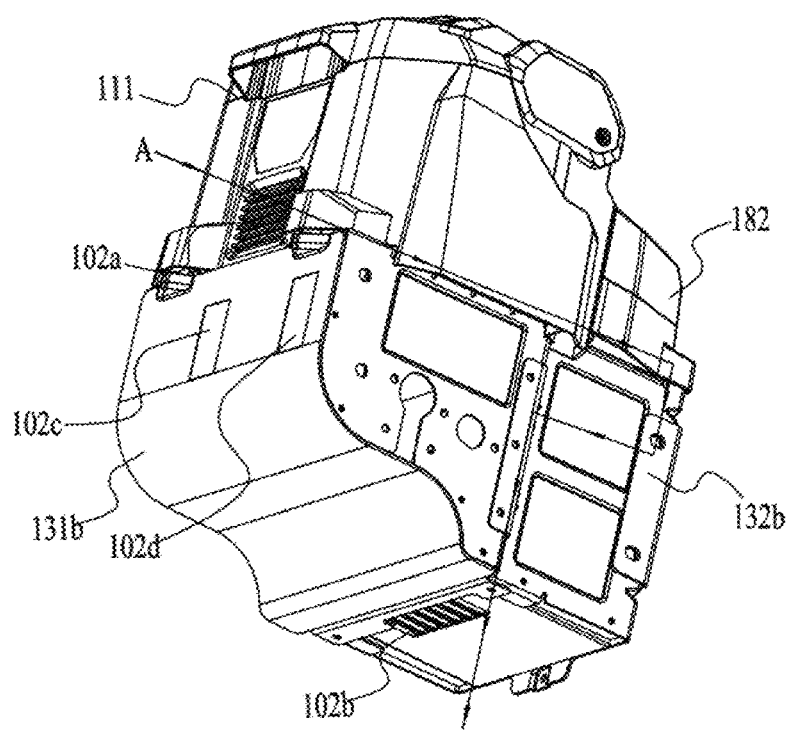
FIG. 24 is a perspective view of the battery pack housing, a first motor housing, a second motor housing, and a circuit board housing of the snow thrower in FIG. 1.

As shown in FIG. 24, the snow thrower 100 further includes a first motor housing 131b and a second motor housing 132b. It can also be said that the motor housing includes a first motor housing 131b and a second motor housing 132b. The first motor housing 131b is formed with a first housing cavity for accommodating the first motor 131; the second motor housing 132b is formed with a second housing cavity for accommodating the second motor 132; wherein the second motor housing 132b is provided between the first motor housing 131b and the housing 112. In this example, the circuit board housing 182 is fixedly connected or detachably connected with the first motor housing 131b through fasteners such as screws.

The battery pack housing 111 is located on the rear side of the second motor housing 132b. The battery pack housing 111 is formed with a first air inlet 102a that opens backwards; the second motor 132 is equipped with a fan and a baffle at the rear; the second motor housing 132b is formed with an air outlet 102b that allows the airflow flowing through the second motor 132 to exhaust downwards. In other words, the first air inlet 102a and the air outlet 102b are respectively provided in the battery pack housing 111 and the second motor housing 132b. The circuit board housing 182 is also formed with a second air inlet that allows air flowing through the battery pack 121 to enter the circuit board housing 182 to cool the circuit board assembly 181. In one example, the first air inlet 102a is disposed at the rear end of the battery pack housing 111, the second air inlet is provided at the rear end of the circuit board housing 182, and the air outlet 102b is provided at the lower end of the second motor housing 132b. As shown in FIG. 24, a first airflow enters from the first air inlet 102a, flows through the battery pack 121, enters the circuit board housing 182 from the second air inlet, flows through the circuit board assembly 181 and then downwards, flows through the first reduction box 143c, and then flows to the second motor 132, goes vertically downward through the baffle and exhaust through the air outlet 102b.

In one example, the first motor 131 is disposed inside the first motor housing 131b; the first motor 131 is connected to a first fan. The first motor housing 131b is provided with a third air inlet 102c for air flowing in and a second air outlet 102d for air flowing out. The air flows in from the third air inlet 102c, flows through the first motor 131, and then flows out from the second air outlet 102d, so as to cool the first motor 131. In one example, the first motor 131 is disposed inside the first motor housing 131b; the first motor 131 is connected to a first fan. The first motor housing 131b is provided with a second air outlet 102d through which air flows out. The air flows in from the assembly gaps of multiple housing parts and flows out from the second air outlet 102d. In one example, the first motor 131 is disposed inside the first motor housing 131b; the first motor 131 is connected to a first fan. With the agitation of the first fan, the air inside the first motor housing 131*b* forms an internal circulation, and heat dissipation is achieved through heat exchange between the first motor housing 131*b* and the outside. The above three possible cooling methods can exist simultaneously or one or two of them can be selected for implementation.

Figure 25:
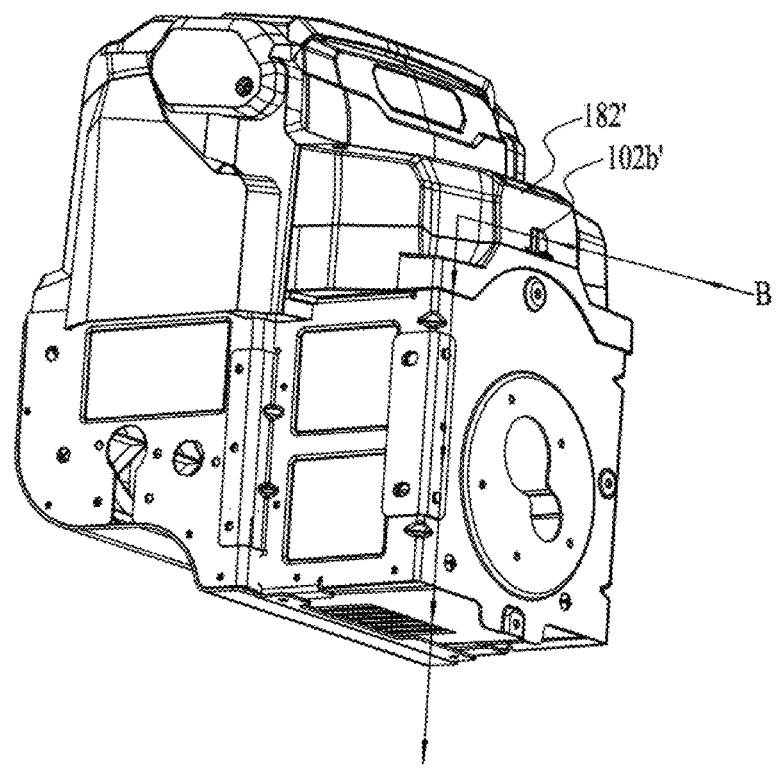
FIG. 25 is another perspective view of the battery pack housing, the first motor housing, the second motor housing, and the circuit board housing of the snow thrower in FIG. 1.

As shown in FIG. 25, in other examples, a fourth air inlet 102*b*' may also be provided on the circuit board housing 182', and a second airflow B enters from the fourth air inlet 102*b*', flows through the circuit board assembly 181 and the second motor 132, and then goes vertically downward through the baffle and exhaust through the air outlet 102*b*; multiple airflows in different directions enable the battery pack 121, the circuit board assembly 181, the first reduction box 143*c*, and the second motor 132 to get better cooling effect.

As shown in FIG. 26, the circuit board assembly 181 includes a mounting box 181*a*, a plurality of circuit boards 181*b*, and a heat sink 181*c*. The mounting box 181*a* is arranged in the circuit board housing 182; the plurality of circuit boards 181*b* are mounted to the mounting box 181*a*; the heat sink 181*c* is connected to at least one circuit board 181*b*. The circuit board housing 182 or the mounting box 181*a* and the second motor housing 132*b* form a fixed connection. The plurality of circuit boards 181*b* are fixedly or detachably connected to the mounting box 181*a*.

The snow thrower 100 also includes a plurality of electronic components and wires. The electronic components are arranged outside the circuit board housing 182; the wires connect the electronic components and the circuit board assembly 181. The electronic components can be motors, switches, or battery packs 121, etc. Wherein, the wires are at least partially disposed outside the circuit board housing 182, one end of the wires connected to the circuit board assembly 181 forms a first terminal, and the circuit board assembly 181 is formed with a second terminal connected to the first terminal, the first terminal and the second terminal form a detachable connection. In other words, one end of the wires connecting the circuit board assembly 181 forms a pluggable and detachable connection with the circuit board assembly 181, which makes it more convenient for the user to plug and unplug the wire and the circuit board assembly 181, thereby facilitating maintenance.

Figure 27:
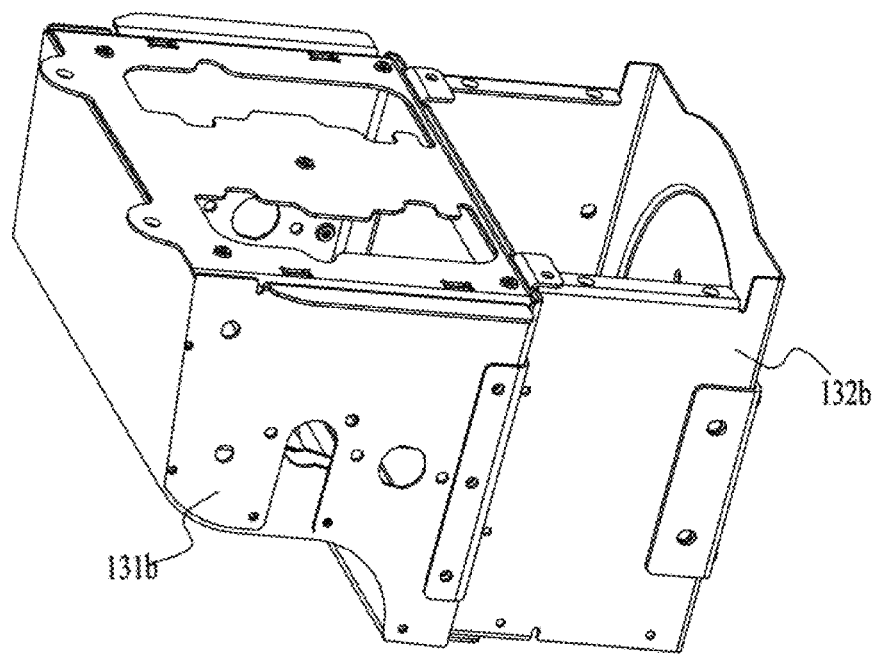
FIG. 27 is a perspective view of the first motor housing and the second motor housing of the snow thrower in FIG. 1.

As shown in FIGS. 13 and 27, the first motor 131 and the walking transmission assembly 141 are both accommodated in a first receiving cavity formed by the first motor housing 131*b*, and the first motor housing 131*b* is fixedly connected to the second motor. The motor housing 132*b* is located on the rear side of the second motor housing 132*b*. In other examples, the first motor 131 and the walking transmission assembly 141 may be separately housed in different housings. In one example, the rear cover of the first motor housing 131*b* and the second motor housing 132*b* are connected by fasteners such as screws. To facilitate maintenance, the rear cover of the first motor housing 131*b* is detachable.

Figure 28:
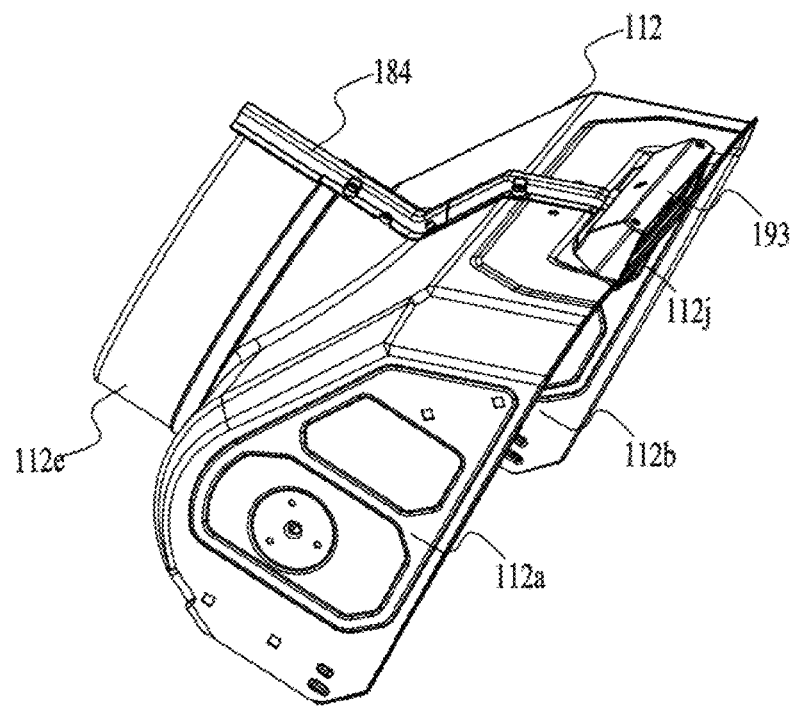
FIG. 28 is a perspective view of a housing, a first lighting assembly and a wire cover of the snow thrower in FIG. 1.
Figure 29:
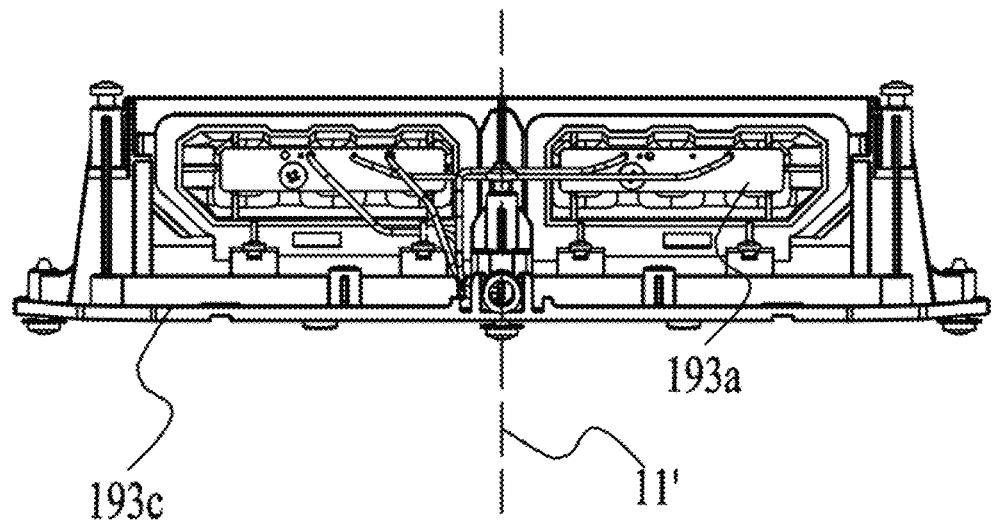
FIG. 29 is a rear view of the first lighting assembly of the snow thrower in FIG. 1 with part of the housing removed.
Figure 30:
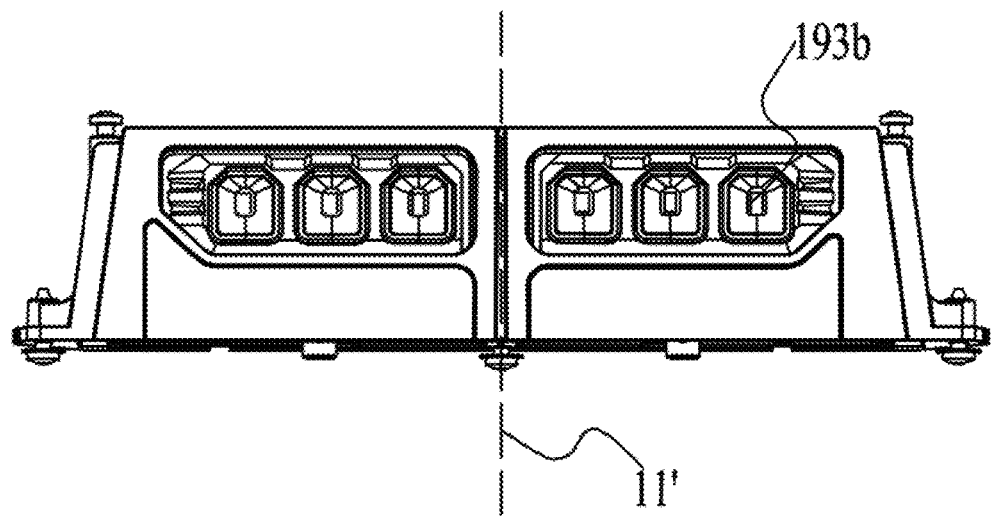
FIG. 30 is a front view of the first lighting assembly of the snow thrower in FIG. 1.

As shown in FIG. 7, the housing 112 includes an inner surface and an outer surface. The inner surface surrounds a first accommodating space 112*b* accommodating at least part of the auger 151. As shown in FIGS. 28-30, the snow thrower 100 further includes a first lighting assembly 193, and the first lighting assembly 193 is configured to emit lighting beams towards the front of the snow thrower 100. The first lighting assembly 193 includes a lamp board 193*a*, a lighting lamp 193*b*, and a mounting base 193*c*. The lighting lamp 193*b* is mounted to the lamp board 193*a*; the mounting base 193*c* supports the lamp board 193*a*; wherein the mounting base 193*c* is connected to the outer surface of the housing 112. In a direction parallel to the first axis 101, the first lighting assembly 193 is basically disposed at the middle of the housing 112; in a vertical direction perpendicular to the first axis 101, the first lighting assembly 193 is mounted above the housing 112. In one example, the first lighting assembly 193 is mounted to the upper and middle position of the auger housing 112*a*. As shown in FIGS. 17 and 28, the outer surface of the housing 112 is recessed downward to form a mounting groove 112*i*, and the first lighting assembly 193 is mounted to the mounting groove 112*i*. The mounting groove 112*i* has a mounting surface 112*j* for mounting the first lighting assembly 193, and the mounting surface 112*j* is substantially parallel to the plane where the snow thrower 100 is placed. This makes the mounting of the first lighting assembly 193 more stable and more reliable, and also reduces the mounting height of the first lighting assembly 193 to avoid collision with obstacles.

The snow thrower 100 further includes a power supply wire for supplying power to the first lighting assembly 193; the power supply wire is electrically connected to the first lighting assembly 193, and the power supply wire is at least partially arranged along the outer surface of the housing 112. The power supply wire electrically connects the circuit board assembly 181 and the first lighting assembly 193, and at least part of the power supply wire extends into the circuit board housing 182. In this example, the power supply wire is arranged along the outer surface of the housing 112. The power supply wire has an extension track along the surface of the housing 112. The extension track passes through the auger housing 112*a* and the impeller housing 112*e*. The projection of the extension track on the ground on which the snow thrower 100 is placed is a continuous straight line segment, which is parallel to or coincides with the first plane 11'. In this example, the first lighting assembly 193 is substantially symmetric about the first plane 11'.

As shown in FIG. 28, the snow thrower 100 further includes a wire cover 184, which is at least partially attached to the outer surface of the housing 112; when the wire cover 184 is mounted to the outer surface of the housing 112, a channel for the wire to pass through is formed between the wire cover 184 and the outer surface. The wire cover 184 is fixedly connected to the housing 112 by fasteners such as screws. The outer surface of the wire cover 184 and the housing 112 surrounds a space for accommodating the power supply wire, and at the same time isolates the power supply wire from the outside, which prevents moisture or dust from entering. At least part of the wire cover 184 extends into the circuit board housing 182. In one example, since the outer surface of the housing 112 is a curved surface, the wire cover 184 may be a complete cover extending between the first lighting assembly 193 and the circuit board assembly 181, or it may be formed by connecting multiple cover segments to each other. In this example, the wire cover 184 is made of two cover segments connected together.

As shown in FIGS. 1, 2, and 20, the operating console 23 is mounted to the operating handle 21, and the operating console 23 is provided with an operating switch 28 for the user to operate to activate the first lighting assembly 193. The snow thrower 100 further includes at least one second lighting assembly 194, which is disposed on the operating console 23. The snow thrower 100 includes two second lighting assemblies 194, and the two second lighting assemblies 194 are respectively arranged on both sides of the operating console 23 and configured to provide lighting in front of the snow thrower 100 in a large area. In this example, the two second first lighting assemblies 193, 194 are symmetrically arranged about the first plane 11'. The first lighting assembly 193 includes six lamps 193b; each of the second lighting assembly 194 includes three lamps.

The operating switch 28 is electrically connected with the second lighting assembly 194 to control whether the second lighting assembly 194 is activated. In other words, the operating switch 28 is electrically connected to the first lighting assembly 193 and the second lighting assembly 194. The user can control the first lighting assembly 193 and the second lighting assembly 194 by operating the operating switch 28. The control logic is as follows: when neither the first lighting assembly 193 nor the second lighting assembly 194 is on, and when the operating switch 28 is triggered a first time, the operating switch 28 controls the first lighting assembly 193 and the second lighting assembly 194 to lit; when the operating switch 28 is triggered a second time, the operating switch 28 controls the second lighting assembly 194 to turn off; when the operating switch 28 is triggered a third time, the operating switch 28 controls the first lighting assembly 193 to turn off.

As shown in FIG. 20, the operating assembly 20 further includes an operation indicator light 195, which is provided on the operating console 23. In this example, the operation indicator light 195 is provided in the middle of the operating console 23 to facilitate user observation. The control logic of the operation indicator light 195 is as follows: press the safety switch 25, the operation indicator light 195 turns green and flashes for a duration of five seconds; five seconds later, if the auger 151 is started, indicate the current status of the machine, if the auger 151 is not started, the operation indicator light 195 restores its state five seconds ago. The flashing green light indicates that the safety switch 25 has been triggered and the auger 151 is ready to start in the current state.

As shown in FIGS. 2 and 7, the snow removal system 15 further includes a snow scraping element 192 configured to scrape snow on the ground. The snow scraping element 192 is provided at the bottom of the auger housing 112a and forms a fixed or detachable connection with the snow thrower housing 112a. In the example, the snow scraping element 192 is a metal piece. The distance between the snow scraping element 192 and the ground is greater than 0 mm and less than or equal to 15 mm, and the distance of the snow scraping element 192 relative to the ground is adjustable to prevent the snow scraping element 192 from scratching the ground under certain working conditions.

The snow removal system 15 also includes skiing shoes 191 arranged at the bottom of the two side walls 112c of the auger housing 112a. The skiing shoes 191 and the auger housing 112a form a fixed or detachable connection. The material of the skiing shoes 191 varies. In this example, the skiing shoes 191 are made of metal. The skiing shoes 191 are arranged to support the auger housing 112a. When the snow thrower 100 is working, the skiing shoes 191 form a surface contact with the ground. In this example, the ski shoe 191 is an axisymmetric structure with an octagonal contour, which is respectively symmetric in the up-down direction and the front-rear direction, and is connected to the side wall 112c of the auger housing 112a by screws or other fasteners. In this example, the screw holes on the surface of the skiing shoes 191 are waist-shaped holes extending in the vertical direction, and the structure of the waist-shaped holes could be used to adjust the position of the skiing shoes 191 in the vertical direction relative to the auger housing 112a.

As shown in FIGS. 1 and 13, the center of gravity of the snow thrower 100 is defined as G, and the center of gravity G is approximately located in the middle of the snow thrower 100 along the front-rear direction. In the front-rear direction, the distance from the grasping center of the operating handle 21 to the center of the walking wheel shaft 161 is L1. In the front-rear direction, the distance from the center of gravity G to the center of the walking wheel shaft 161 is L2. In the front-rear direction, the distance from the center of gravity G to the first axis 101 is L3. In the front-rear direction, the distance from the center of the walking wheel shaft 161 to the first axis 101 is L, then L=L3+L2, and in the front-rear direction, the center of gravity G is located between the first axis 101 and the walking wheel shaft 161. Further, the center of gravity G is located at a certain position within the above range, such that L1, L2 and L3 satisfy the following functional relationship: y=f(L1,L2,L3). In the up-down direction, the distance from the center of gravity G to the second axis 102 is H, wherein 0≤H≤200 (mm). The battery pack 121 is at least partially located above the walking wheel assembly 16 and behind the second motor 132 to balance the center of gravity G.

What is claimed is:

1. A snow thrower, comprising:
   a body housing;
   a first drive shaft capable of rotating about a first axis;
   an auger comprising auger blades mounted to the first drive shaft;
   a second drive shaft capable of rotating about a second axis;
   an impeller comprising an impeller base mounted to the second drive shaft and impeller blades mounted to the impeller base;
   a walking wheel assembly configured to support the snow thrower to enable the snow thrower to walk on a surface;
   a first electric motor configured to drive the walking wheel assembly to rotate;
   a second electric motor configured to drive the auger to rotate about the first axis and drive the impeller to rotate about the second axis;
   a first reduction assembly for realizing power transmission between the second electric motor and the second drive shaft;
   a second reduction assembly for realizing power transmission between the second drive shaft and the first drive shaft;
   at least one battery pack configured to supply power to the first electric motor and the second electric motor; and
   a plurality of gears cooperating to provide a gear meshing transmission between the second electric motor and the second drive shaft;
   wherein a ratio of an output rotational speed of the second electric motor to a rotational speed of the second drive shaft is defined to be a first transmission ratio of the first reduction assembly, and the first transmission ratio is greater than or equal to 8 and less than or equal to 12.

2. The snow thrower of claim 1, wherein a ratio of a sum of a rated capacity of the at least one battery pack to a rated output power of the second electric motor is greater than or equal to 2 Ah/kw and less than or equal to 6 Ah/kw.

3. The snow thrower of claim 1, wherein the rotational speed of the impeller is greater than or equal to 500 rpm and less than or equal to 1500 rpm.

4. The snow thrower of claim 1, wherein a ratio of the rotational speed of the second drive shaft to a rotational speed of the first drive shaft is defined to be a second transmission ratio of the second reduction assembly and the second transmission ratio is greater than or equal to 8 and less than or equal to 12.

5. The snow thrower of claim 1, wherein a number of the at least one battery pack is two.

6. The snow thrower of claim 5, wherein the at least one battery pack is a DC lithium battery pack.

7. The snow thrower of claim 5, wherein the body housing comprises a battery pack housing for accommodating the at least one battery pack and the at least one battery pack is capable of being detached from the battery pack housing.

8. The snow thrower of claim 1, wherein an axis of rotation of the second electric motor and the second axis about which the impeller rotates are parallel to each other.

9. The snow thrower of claim 1, wherein the second axis and the first axis are perpendicular to each other.

10. A snow thrower, comprising:
a body housing;
a first drive shaft capable of rotating about a first axis;
an auger comprising auger blades mounted to the first drive shaft;
a second drive shaft capable of rotating about a second axis;
an impeller comprising an impeller base mounted to the second drive shaft and impeller blades mounted to the impeller base;
a walking wheel assembly configured to support the snow thrower to enable the snow thrower to walk on a surface;
a first electric motor configured to drive the walking wheel assembly to rotate;
a second electric motor configured to drive the auger to rotate about the first axis and drive the impeller to rotate about the second axis;
a first reduction assembly for realizing power transmission between the second electric motor and the second drive shaft;
a second reduction assembly for realizing power transmission between the second drive shaft and the first drive shaft; and
a plurality of gears cooperating to provide a gear meshing transmission between the second electric motor and the second drive shaft such that there is no belt drive mechanism between the second electric motor and the second drive shaft.

11. The snow thrower of claim 10, further comprising at least one battery pack configured to supply power to the first electric motor and the second electric motor, wherein a ratio of a sum of a rated capacity of the at least one battery pack to a rated output power of the second electric motor is greater than or equal to 0.8 Ah/kW and less than or equal to 8 Ah/kW.

12. The snow thrower of claim 10, wherein an output power of the second electric motor is greater than or equal to 2500 W and less than or equal to 6000 W.

* * * * *